US012120723B2

(12) United States Patent
Park et al.

(10) Patent No.: US 12,120,723 B2
(45) Date of Patent: Oct. 15, 2024

(54) METHOD FOR TRANSMITTING DATA ON RESOURCE SELECTED BY SENSING OR RANDOMLY SELECTED IN WIRELESS COMMUNICATION SYSTEM

(71) Applicant: LG ELECTRONICS INC., Seoul (KR)

(72) Inventors: Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 17/597,358

(22) PCT Filed: Aug. 5, 2020

(86) PCT No.: PCT/KR2020/010343
§ 371 (c)(1),
(2) Date: Jan. 4, 2022

(87) PCT Pub. No.: WO2021/025467
PCT Pub. Date: Feb. 11, 2021

(65) Prior Publication Data
US 2022/0256548 A1    Aug. 11, 2022

(30) Foreign Application Priority Data
Aug. 5, 2019    (KR) .......................... 10-2019-0094931

(51) Int. Cl.
*H04W 72/542*    (2023.01)
*H04W 74/08*    (2024.01)

(52) U.S. Cl.
CPC ......... *H04W 72/542* (2023.01); *H04W 74/08* (2013.01)

(58) Field of Classification Search
USPC .......................................................... 370/329
See application file for complete search history.

(56) References Cited

U.S. PATENT DOCUMENTS

| 2016/0381666 | A1* | 12/2016 | Kim | ..................... | H04L 5/0055 |
| | | | | | 370/329 |
| 2019/0174530 | A1* | 6/2019 | Kim | ..................... | H04W 72/12 |

FOREIGN PATENT DOCUMENTS

| KR | 10-2016-0128296 | 11/2016 |
| WO | 2018-004322 | 1/2018 |

OTHER PUBLICATIONS

PCT International Application No. PCT/KR2020/010343, International Search Report dated Nov. 25, 2020, 5 pages.

(Continued)

*Primary Examiner* — Gary Mu
*Assistant Examiner* — Hooman Houshmand
(74) *Attorney, Agent, or Firm* — LEE, HONG, DEGERMAN, KANG & WAIMEY

(57) ABSTRACT

A method for performing an operation for a first terminal in a wireless communication system comprises the steps of: determining that a physical layer problem has occurred during communication with a base station; switch from resource allocation mode 1 to resource allocation mode 2 on the basis of the physical layer problem; and transmitting, in resource allocation mode 2, sidelink data to a second terminal by using a sidelink resource, wherein the sidelink resource is determined as a sensing-based resource and/or a random selection-based resource in consideration of the latency budget and sensing validity period of the sidelink data.

6 Claims, 30 Drawing Sheets

(56) References Cited

OTHER PUBLICATIONS

Huawei et al., "Discussion on sidelink resource allocation mode 1," R1-1906010, 3GPP TSG RAN WG1 Meeting #97, May 2019, 11 pages.
LG Electronics, "Discussion on resource allocation for NR sidelink Mode 2," R1-1907789, 3GPP TSG RAN WG1 #97, May 2019, 14 pages.
3rd Generation Partnership Project, "Technical Specification Group Radio Access Network; NR; Medium Access Control (MAC) protocol specification (Release 15)," 3GPP TS 38.321 V15.6.0, Jun. 2019, 80 pages.
Korean Intellectual Property Office Application No. 10-2022-7000633, Office Action dated Jun. 17, 2024, 8 pages.
LG Electronics Inc., "Temporal use of mode2—details and expansion", R2-143742, 3GPP TSG-RAN WG2 #87, Aug. 2014, 3 pages.

\* cited by examiner (a)

(b)

(a)

(b)

METHOD FOR TRANSMITTING DATA ON RESOURCE SELECTED BY SENSING OR RANDOMLY SELECTED IN WIRELESS COMMUNICATION SYSTEM

CROSS-REFERENCE TO RELATED APPLICATIONS

This application is the National Stage filing under 35 U.S.C. 371 of International Application No. PCT/KR2020/010343, filed on Aug. 5, 2020, which claims the benefit of earlier filing date and right of priority to Korean Application No. 10-2019-0094931, filed on Aug. 5, 2019, the contents of all of which are hereby incorporated by reference herein in their entireties.

TECHNICAL FIELD

The present disclosure relates to a wireless communication system, and more particularly to a method and apparatus for use of a sidelink resource when a problem occurs in communication between a sidelink terminal and a base station.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

A technical object of embodiment(s) is to determine a resource used to perform sidelink communication when a problem occurs in communication between a base station and a sidelink terminal operating in a resource allocation mode 1.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, a method of performing an operation for a first terminal in a wireless communication system includes determining that a problem in terms of a physical layer is communication with a base station, switching to a resource allocation mode 2 from a resource allocation mode 1 based on the problem in terms of the physical layer, and transmitting sidelink data based on a sidelink resource to a second terminal in the resource allocation mode 2, wherein the sidelink resource is determined as any one of a sensing-based resource or a random selection-based resource in consideration of a latency budget and a sensing validity period of the sidelink data.

According to another aspect of the present disclosure, a first terminal in a wireless communication system includes at least one processor, and at least one computer memory operatively connected to the at least one processor and configured to store commands for allowing the at least one processor to perform operations when being executed, wherein the operations includes determining that a problem in terms of a physical layer occurs in communication with a base station, switching to a resource allocation mode 2 from a resource allocation mode 1 based on the problem in terms of the physical layer, and transmitting sidelink data based on a sidelink resource to a second terminal in the resource allocation mode 2, and wherein the sidelink resource is determined as any one of a sensing-based resource or a random selection-based resource in consideration of a latency budget and a sensing validity period of the sidelink data.

According to another aspect of the present disclosure, a processor configured to perform operations of a first terminal in a wireless communication system, the operations includes determining that a problem in terms of a physical layer occurs in communication with a base station, switching to a resource allocation mode 2 from a resource allocation mode 1 based on the problem in terms of the physical layer, and transmitting sidelink data based on a sidelink resource to a second terminal in the resource allocation mode 2, wherein the sidelink resource is determined as any one of a sensing-based resource or a random selection-based resource in consideration of a latency budget and a sensing validity period of the sidelink data.

According to another aspect of the present disclosure, a computer-readable recording medium having recorded thereon at least one program including a command for performing operations for a first terminal by at least one processor when being executed by the at least one processor, the operations includes determining that a problem in terms of a physical layer occurs in communication with a base station, switching to a resource allocation mode 2 from a resource allocation mode 1 based on the problem in terms of the physical layer, and transmitting sidelink data based on a sidelink resource to a second terminal in the resource allocation mode 2, wherein the sidelink resource is determined as any one of a sensing-based resource or a random selection-based resource in consideration of a latency budget and a sensing validity period of the sidelink data.

The sensing validity period may be any one of a long term sensing validity period or a short term sensing validity period.

The sidelink resource may be determined as the sensing-based resource when an available time to complete transmission after sensing during the sensing validity period is within the latency budget, and may be determined as the random selection-based resource when the available time to complete transmission after sensing during the sensing validity period is after the latency budget.

The latency budget may be a maximum delay period for effectively transmitting the sidelink data.

The sensing validity period may be a period for effectively determining the sensing-based resource.

When detecting beam failure equal to or greater than a threshold, the first terminal may determine that the problem in terms of the physical layer occurs in communication with the base station.

When detecting or declaring radio link failure, the first terminal may determine that the problem in terms of the physical layer occurs in communication with the base station.

The method may further include starting a timer for recovery of the problem in terms of the physical layer, wherein the first terminal may transmit the sidelink data based on the sidelink resource before expiration of the timer for recovery of the problem in terms of the physical layer.

The first terminal may be a terminal communicating with at least one of another terminal, a terminal related to autonomous vehicle, a base station, or a network.

Advantageous Effects

According to an embodiment, when a predetermined condition is satisfied, a first terminal may use a sensing-based resource, and thus resource collision may be prevented.

It will be appreciated by persons skilled in the art that that the effects that can be achieved through the embodiments of the present disclosure are not limited to those described above and other advantageous effects of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

BEST MODE

The embodiments in various embodiments of the present disclosure, "I" and ",," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
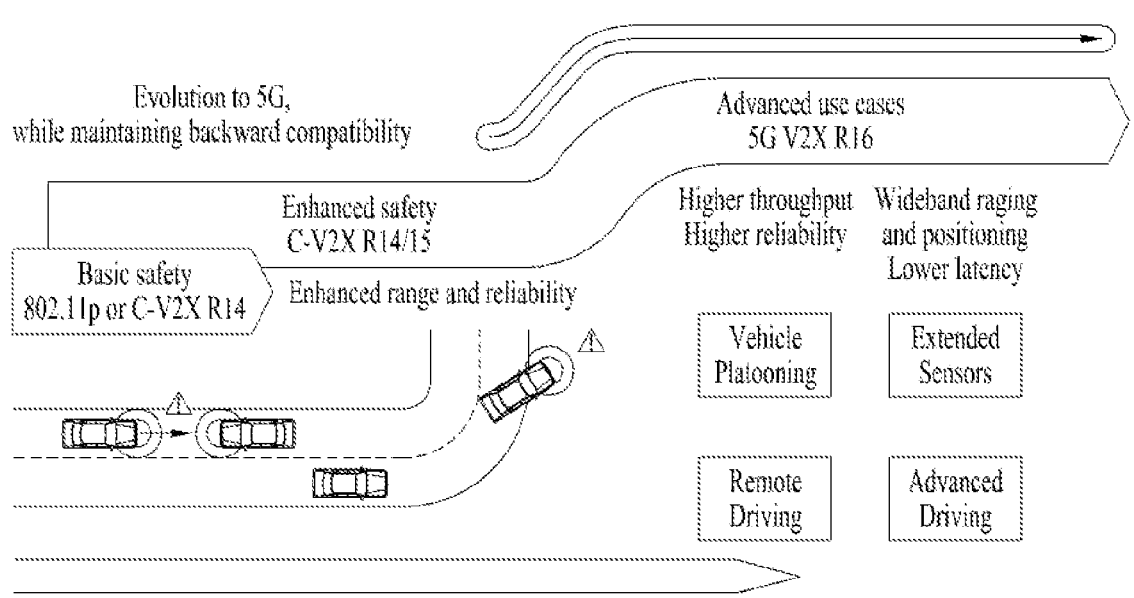
FIG. 1 is a diagram illustrating vehicle-to-everything (V2X) communication based on pre-new radio access technology (NR) RAT and V2X communication based on NR in comparison.
Figure 2:
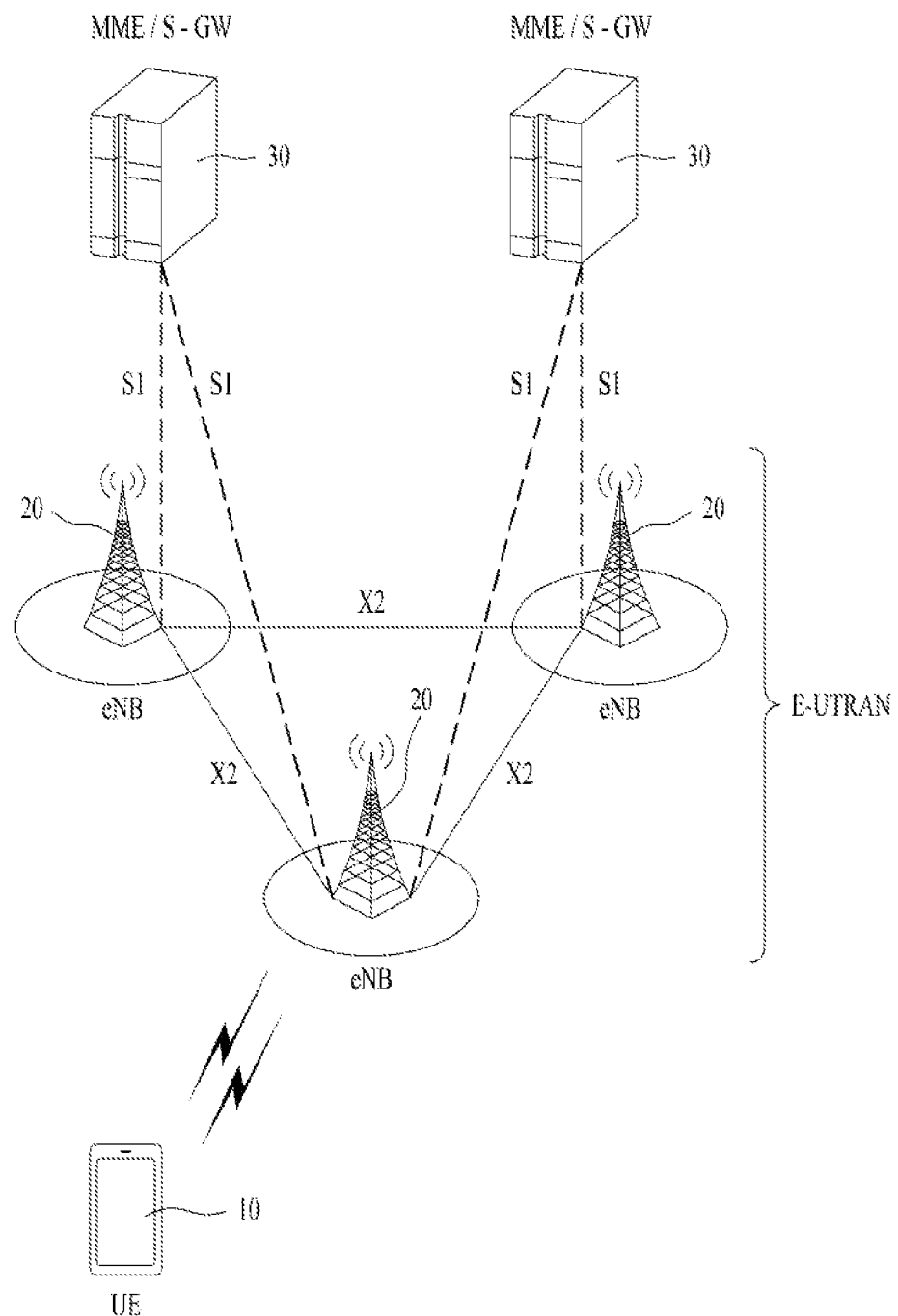
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNB s) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
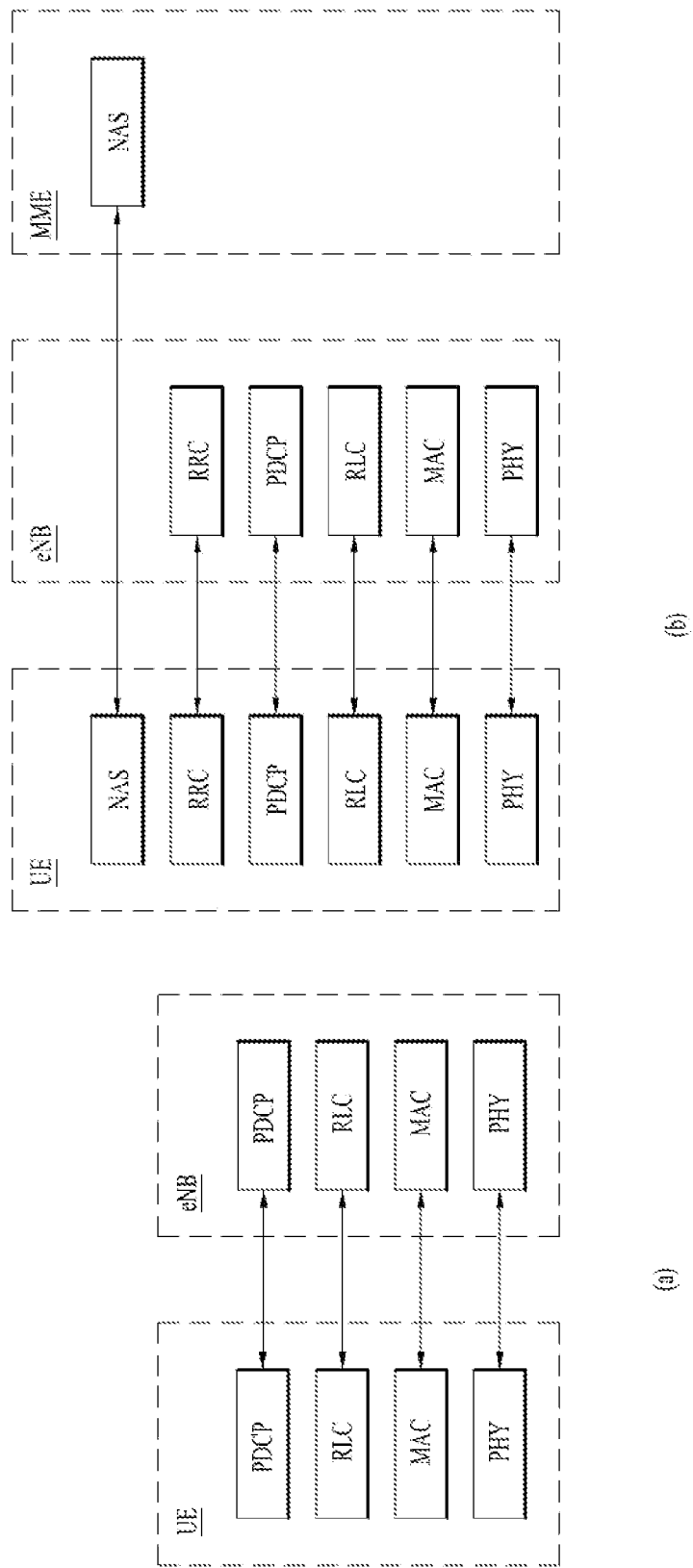
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
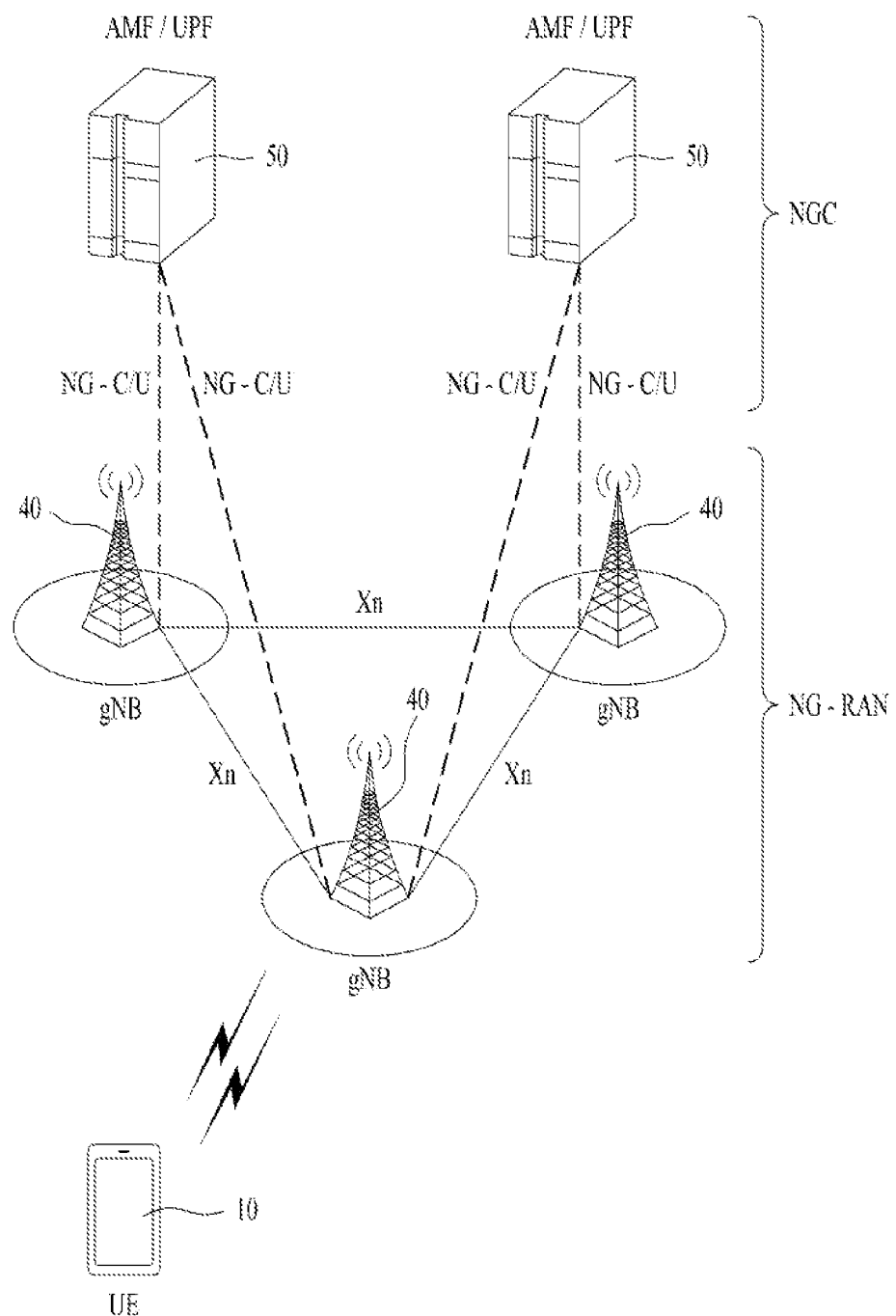
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNB s, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
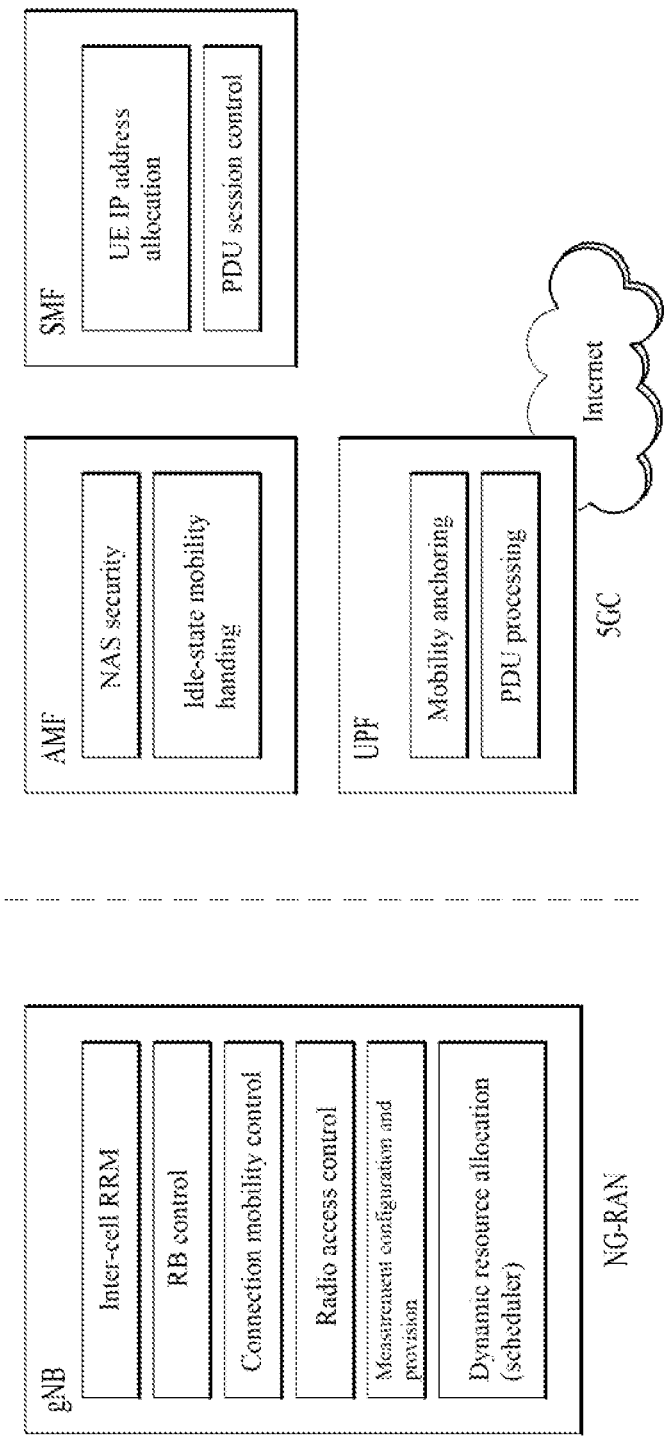
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
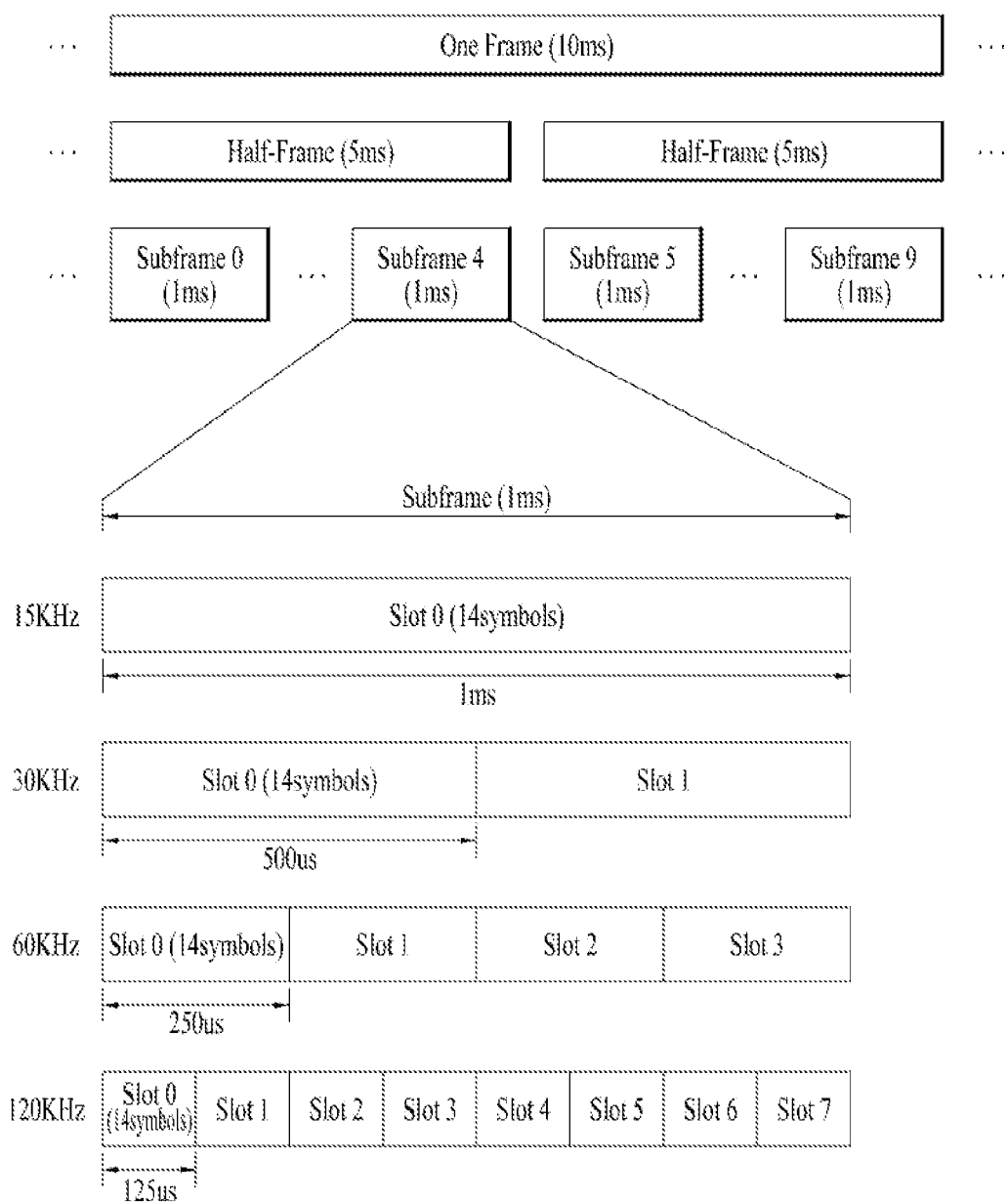
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
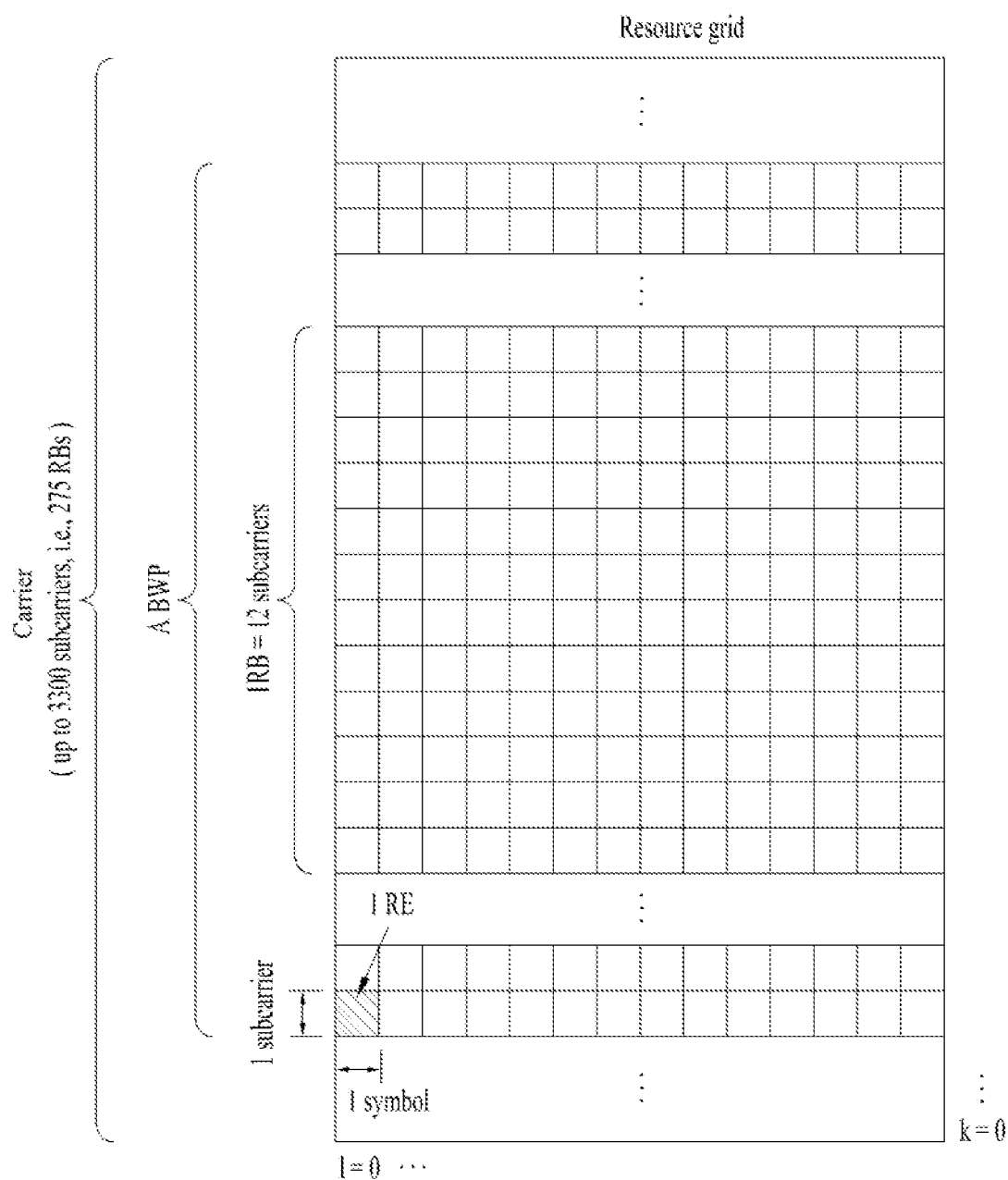
FIG. 7 is a diagram illustrating a slot structure in an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCP layer, or the SDAP layer. For example, L3 may refer to the RRC layer.

Now, a description will be given of sidelink (SL) communication.

Figure 8:
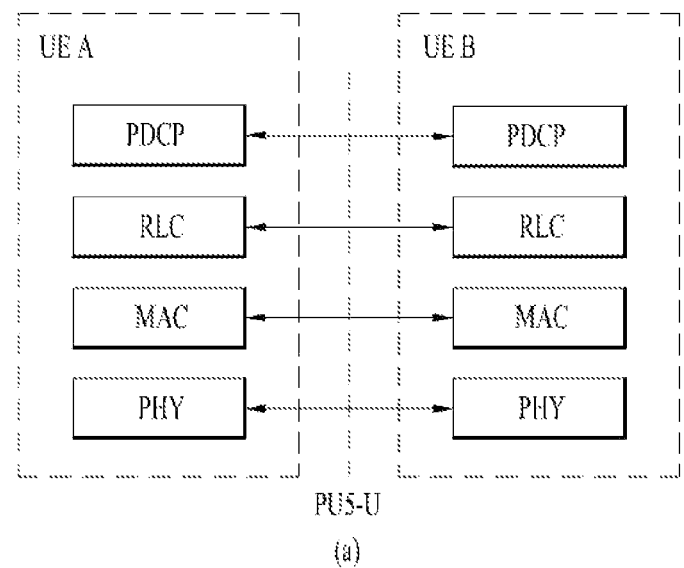
FIG. 8 is a diagram illustrating radio protocol architectures for sidelink (SL) communication according to an embodiment of the present disclosure.
Figure 8:
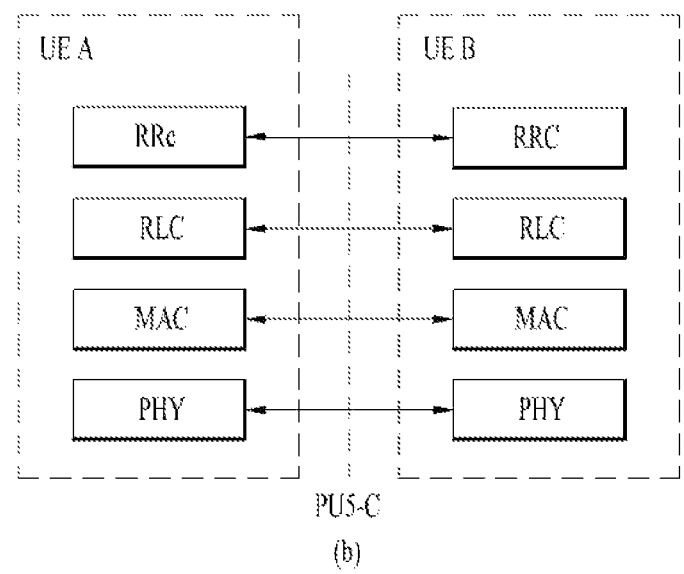

FIG. 8 illustrates a radio protocol architecture for SL communication according to an embodiment of the present disclosure. Specifically, FIG. 8(*a*) illustrates a user-plane protocol stack in LTE, and FIG. 8(*b*) illustrates a control-plane protocol stack in LTE.

Figure 9:
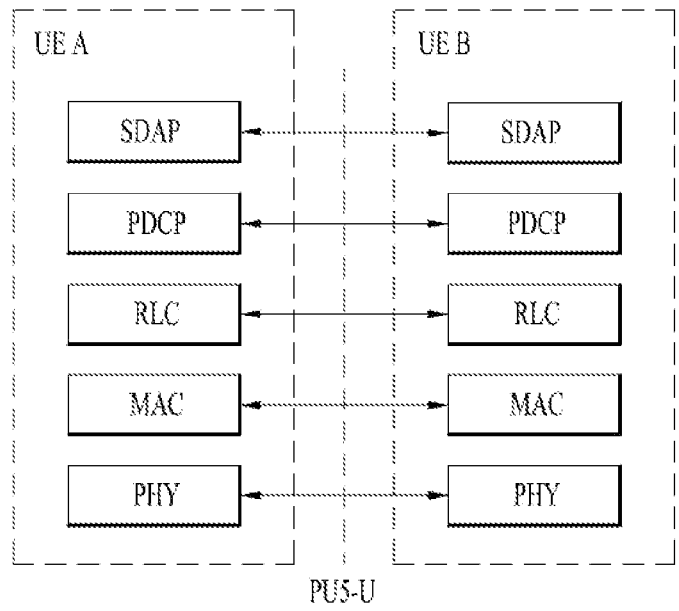
FIG. 9 is a diagram illustrating radio protocol architectures for SL communication according to an embodiment of the present disclosure.
Figure 9:
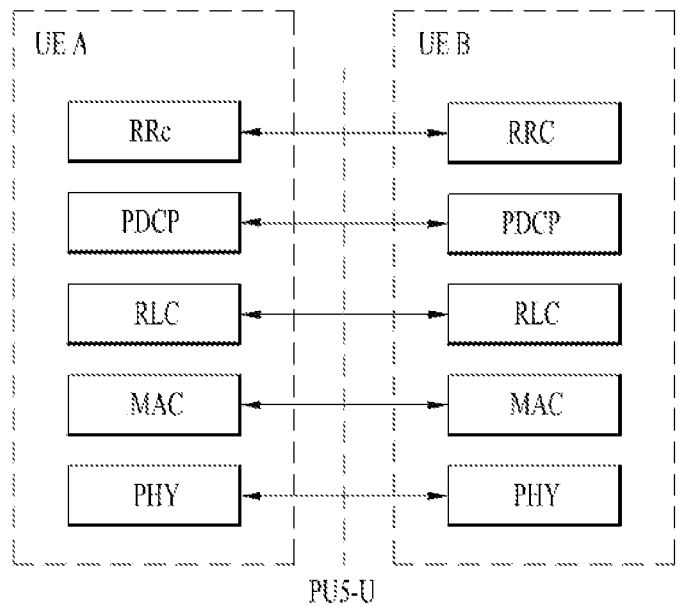

FIG. 9 illustrates a radio protocol architecture for SL communication according to an embodiment of the present disclosure. Specifically, FIG. 9(*a*) illustrates a user-plane protocol stack in NR, and FIG. 9(*b*) illustrates a control-plane protocol stack in NR.

Figure 10:
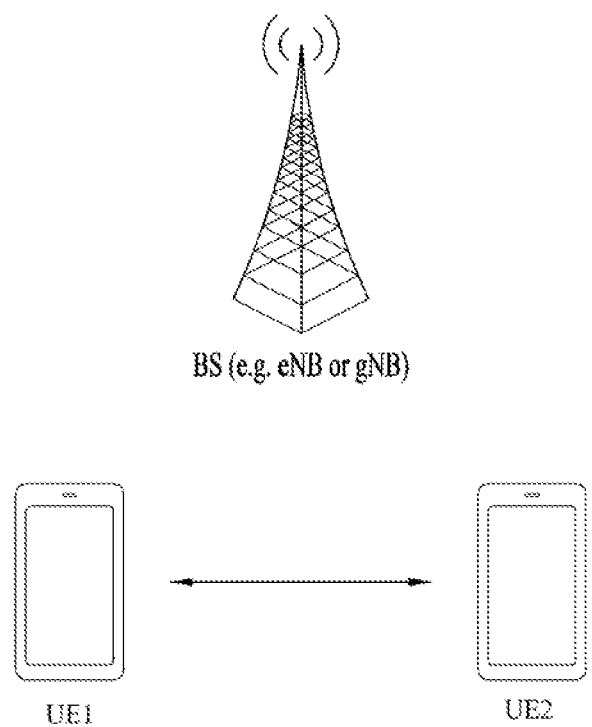
FIG. 10 is a diagram illustrating user equipments (UEs) which conduct V2X or SL communication between them according to an embodiment of the present disclosure.

FIG. 10 illustrates UEs that conduct V2X or SL communication between them according to an embodiment of the present disclosure.

Referring to FIG. 10, the term "UE" in V2X or SL communication may mainly refer to a terminal of a user. However, when network equipment such as a BS transmits and receives a signal according to a UE-to-UE communication scheme, the BS may also be regarded as a kind of UE. For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 11:
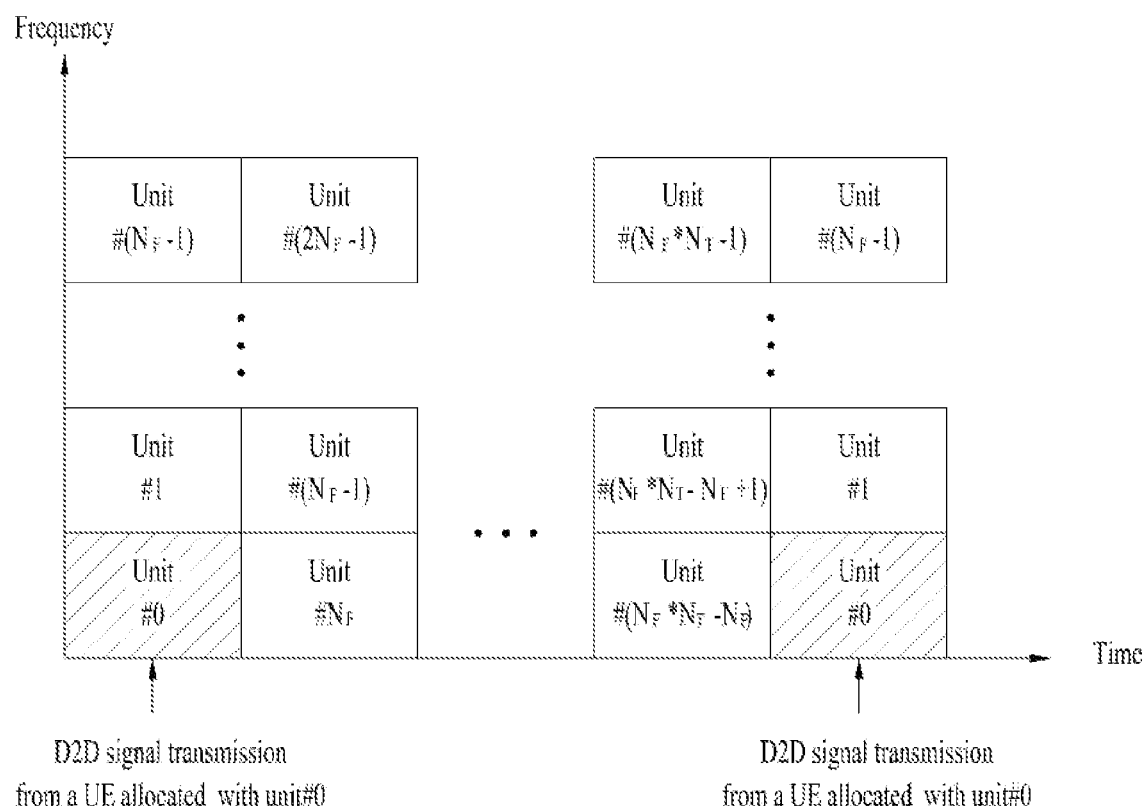
FIG. 11 is diagram illustrating resource units for V2X or SL communication according to an embodiment of the present disclosure.

FIG. 11 illustrates resource units for V2X or SL communication according to an embodiment of the present disclosure.

Figure 13:
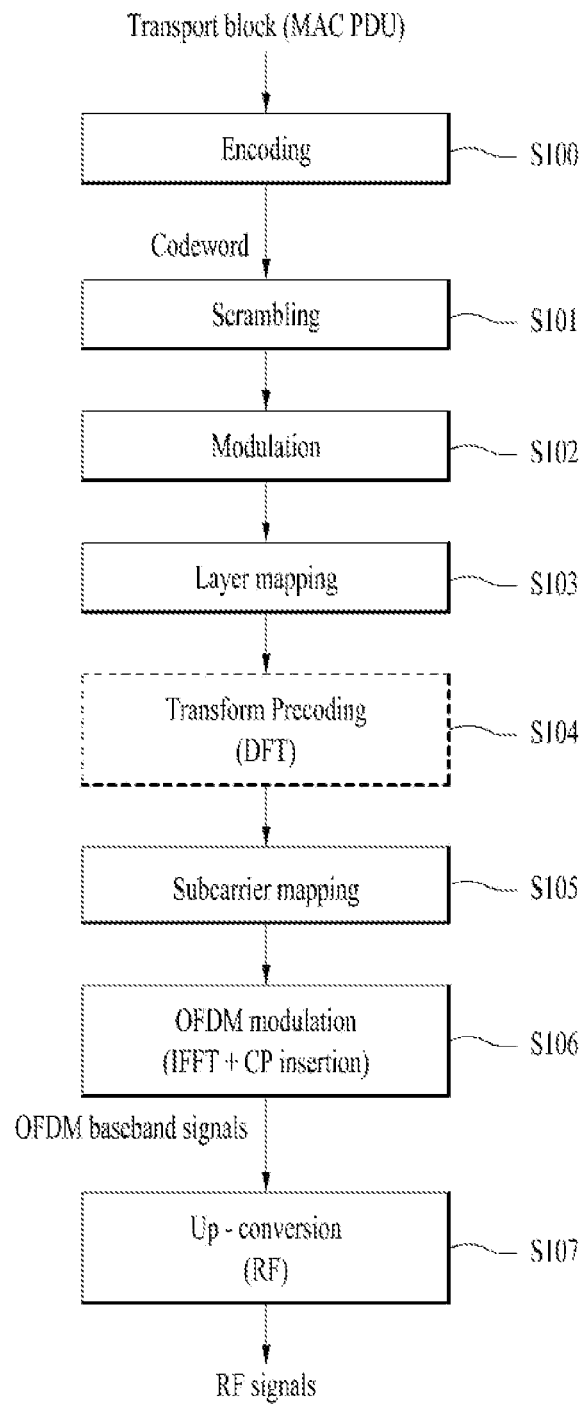
FIG. 13 is a diagram illustrating physical (PHY)-layer processing at a transmitting side according to an embodiment of the present disclosure.

Referring to FIG. 11, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 12:
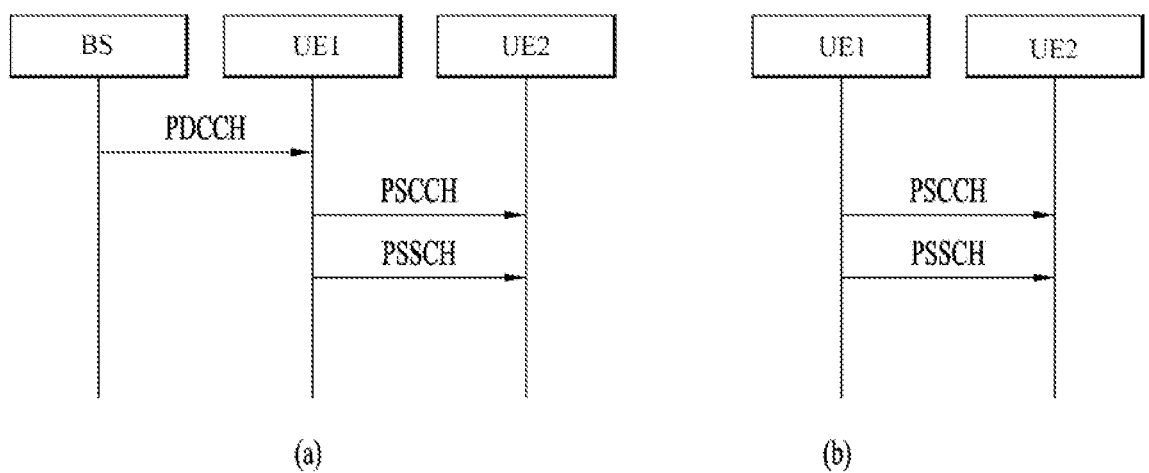
FIG. 12 is a diagram illustrating signal flows for V2X or SL communication procedures of a UE according to transmission modes according to an embodiment of the present disclosure.

FIG. 12 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 12(a) illustrates a UE operation related to LTE transmission mode 1 or LTE transmission mode 3. Alternatively, for example, FIG. 12(a) illustrates a UE operation related to NR resource allocation mode 1. For example, LTE transmission mode 1 may be applied to general SL communication, and LTE transmission mode 3 may be applied to V2X communication.

For example, FIG. 12(b) illustrates a UE operation related to LTE transmission mode 2 or LTE transmission mode 4. Alternatively, for example, FIG. 12(b) illustrates a UE operation related to NR resource allocation mode 2.

Referring to FIG. 12(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every X ms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 12(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis. UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SL radio link monitoring (SLM) will be described below.

For unicast AS-level link management, SL RLM and/or radio link failure (RLF) declaration may be supported. In RLC acknowledged mode (SL AM) of SL unicast, the RLF declaration may be triggered by an indication from the RLC indicating that a maximum number of retransmissions has been reached. An AS-level link status (e.g., failure) may need to be known to a higher layer. Unlike the RLM procedure for unicast, a groupcast-related RLM design may not be considered. The RLM and/or RLF declaration may not be needed between group members for groupcast.

For example, the transmitting UE may transmit an RS to the receiving UE, and the receiving UE may perform SL RLM using the RS. For example, the receiving UE may declare an SL RLF using the RS. For example, the RS may be referred to as an SL RS.

SL measurement and reporting will be described below.

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. For unicast communication, a CQI, an RI and a PMI or a part of them may be supported in a non-subband-based aperiodic CSI report based on the assumption of four or fewer antenna ports. The CSI procedure may not depend on a standalone RS. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

PHY-layer processing will be described below.

According to an embodiment of the present disclosure, a data unit may be subjected to PHY-layer processing at a transmitting side before being transmitted over an air interface. According to an embodiment of the present disclosure, a radio signal carrying a data unit may be subjected to PHY-layer processing at a receiving side.

FIG. 13 illustrates PHY-layer processing at a transmitting side according to an embodiment of the present disclosure.

Table 5 may illustrate a mapping relationship between UL transport channels and physical channels, and Table 6 may illustrate a mapping relationship between UL control channel information and physical channels.

TABLE 5

| Transport channel | Physical channel |
| --- | --- |
| UL-SCH (UL-Shared Channel) | PUSCH (Physical UL Shared Channel) |
| RACH (Random Access Channel) | PRACH (Physical Random Access Channel) |

TABLE 6

| Control information | Physical channel |
| --- | --- |
| UCI (UL Control Information) | PUCCH (Physical UL Control Channel) |
| | PUSCH (Physical UL Shared Channel) |

Table 7 may illustrate a mapping relationship between DL transport channels and physical channels, and Table 8 may illustrate a mapping relationship between DL control channel information and physical channels.

TABLE 7

| Transport channel | Physical channel |
| --- | --- |
| DL-SCH (DL-Shared Channel) | PDSCH (Physical DL Shared Channel) |
| BCH (Broadcast Channel) | PBCH (Physical Broadcast Channel) |
| PCH (Paging Channel) | PDSCH (Physical DL Shared Channel) |

TABLE 8

| Control information | Physical channel |
| --- | --- |
| DCI (DL Control Information) | PDCCH (Physical DL Control Channel) |

Table 9 may illustrate a mapping relationship between SL transport channels and physical channels, and Table 10 may illustrate a mapping relationship between SL control channel information and physical channels.

TABLE 9

| Transport channel | Physical channel |
| --- | --- |
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 10

| Control information | Physical Channel |
| --- | --- |
| 1st-stage SCI | PSCCH |
| 2nd-stage SCI | PSSCH |
| SFCI | PSFCH |

Referring to FIG. 13, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the NR system, the following channel coding schemes may be used for different types of transport channels and different types of control information. For example, channel coding schemes for respective transport channel types may be listed as in Table 11. For example, channel coding schemes for respective control information types may be listed as in Table 12

TABLE 11

| Transport channel | Channel coding scheme |
| --- | --- |
| UL-SCH<br>DL-SCH<br>SL-SCH<br>PCH | LDPC (Low Density Parity Check) |
| BCH<br>SL-BCH | Polar code |

TABLE 12

| Control information | Channel coding scheme |
| --- | --- |
| DCI<br>SCI | Polar code |
| UCI | Block, code, Polar code |

For example, a polar code may be applied to the PSCCH. For example, an LDPC code may be applied to a TB transmitted on the PSSCH.

For transmission of a TB (e.g., a MAC PDU), the transmitting side may attach a CRC sequence to the TB. Thus, the transmitting side may provide error detection for the receiving side. In SL communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CB s may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 13, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complexed-value modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is, the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complexed-value modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing (SPS) configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFT signal to generate an OFDM baseband signal.

In step S107, the transmitting side may perform up-conversion. The communication device of the transmitting side may upconvert the OFDM baseband signal, the SCS configuration u, and the OFDM symbol 1 for the antenna port p to a carrier frequency f0 of a cell to which the physical channel is allocated.

Figure 22:
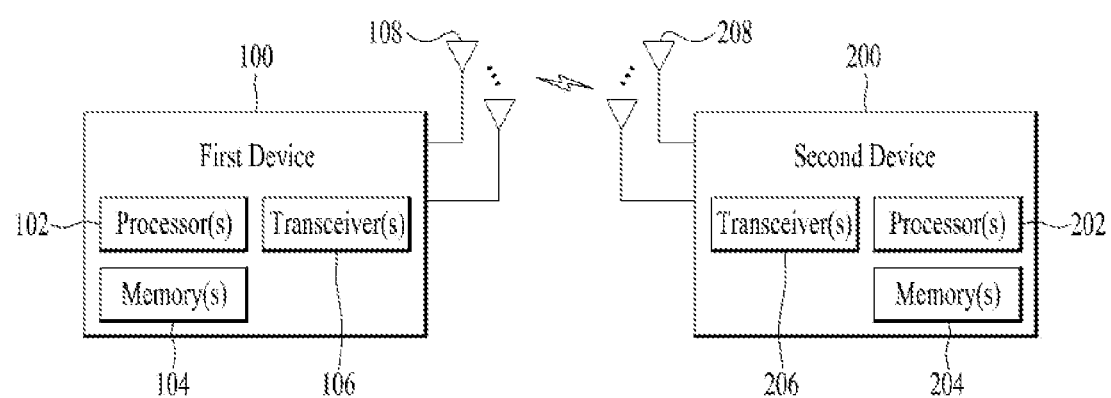
FIG. 22 illustrates wireless devices applicable to the present disclosure.

Processors 102 and 202 of FIG. 22 may be configured to perform encoding, scrambling, modulation, layer mapping, precoding transformation (for UL), subcarrier mapping, and OFDM modulation.

Figure 14:
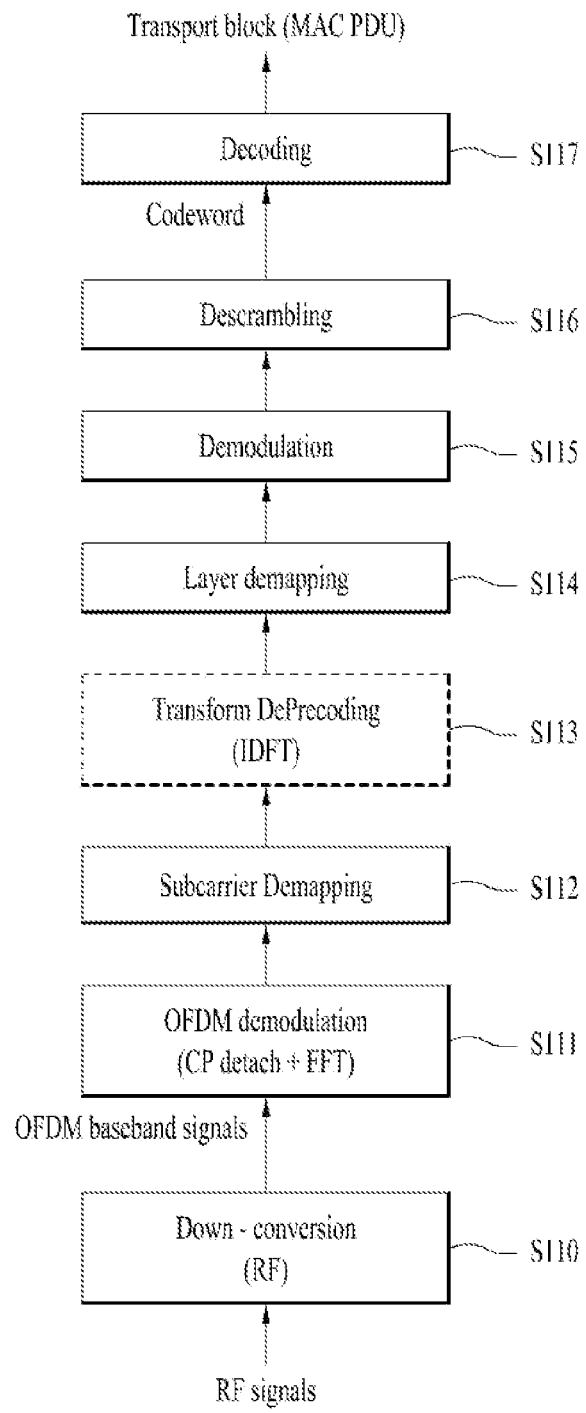
FIG. 14 is a diagram illustrating PHY-layer processing at a receiving side according to an embodiment of the present disclosure.

FIG. 14 illustrates PHY-layer processing at a receiving side according to an embodiment of the present disclosure.

The PHY-layer processing of the receiving side may be basically the reverse processing of the PHY-layer processing of a transmitting side.

In step S110, the receiving side may perform frequency downconversion. A communication device of the receiving side may receive a radio frequency (RF) signal in a carrier frequency through an antenna. A transceiver 106 or 206 that receives the RF signal in the carrier frequency may down-convert the carrier frequency of the RF signal to a baseband to obtain an OFDM baseband signal.

In step S111, the receiving side may perform OFDM demodulation. The communication device of the receiving side may acquire complex-valued modulation symbols by CP detachment and fast Fourier transform (FFT). For example, for each OFDM symbol, the communication device of the receiving side may remove a CP from the OFDM baseband signal. The communication device of the receiving side may then perform FFT on the CP-free OFDM baseband signal to obtain complexed-value modulation symbols for an antenna port p, an SCS u, and an OFDM symbol 1.

In step S112, the receiving side may perform subcarrier demapping. Subcarrier demapping may be performed on the complexed-value modulation symbols to obtain complexed-value modulation symbols of the physical channel. For example, the processor of a UE may obtain complexed-value modulation symbols mapped to subcarriers of a PDSCH among complexed-value modulation symbols received in a BWP.

In step S113, the receiving side may perform transform de-precoding. When transform precoding is enabled for a UL physical channel, transform de-precoding (e.g., inverse discrete Fourier transform (IDFT)) may be performed on complexed-value modulation symbols of the UL physical channel. Transform de-precoding may not be performed for a DL physical channel and a UL physical channel for which transform precoding is disabled.

In step S114, the receiving side may perform layer demapping. The complexed-value modulation symbols may be demapped into one or two codewords.

In steps S115 and S116, the receiving side may perform demodulation and descrambling. The complexed-value modulation symbols of the codewords may be demodulated and descrambled into bits of the codewords.

In step S117, the receiving side may perform decoding. The codewords may be decoded into TBs. For a UL-SCH and a DL-SCH, LDPC base graph 1 or LDPC base graph 2 may be selected based on the size and coding rate R of a TB. A codeword may include one or more CBs. Each coded block may be decoded into a CB to which a CRC has been attached or a TB to which a CRC has been attached, by the selected LDPC base graph. When CB segmentation has been performed for the TB attached with the CRC at the transmitting side, a CRC sequence may be removed from each of the CBs each attached with a CRC, thus obtaining CBs. The CBs may be concatenated to a TB attached with a CRC. A TB CRC sequence may be removed from the TB attached with the CRC, thereby obtaining the TB. The TB may be delivered to the MAC layer.

Each of processors 102 and 202 of FIG. 22 may be configured to perform OFDM demodulation, subcarrier demapping, layer demapping, demodulation, descrambling, and decoding.

In the above-described PHY-layer processing on the transmitting/receiving side, time and frequency resources (e.g., OFDM symbol, subcarrier, and carrier frequency) related to subcarrier mapping, OFDM modulation, and frequency upconversion/downconversion may be determined based on a resource allocation (e.g., an UL grant or a DL assignment).

A BWP and a resource pool will be described below.

When bandwidth adaptation (BA) is used, the reception bandwidth and transmission bandwidth of the UE need not be as large as the bandwidth of a cell, and may be adjusted. For example, the network/BS may inform the UE of the bandwidth adjustment. For example, the UE may receive information/a configuration for bandwidth adjustment from the network/BS. In this case, the UE may perform bandwidth adjustment based on the received information/configuration. For example, the bandwidth adjustment may include a decrease/increase of the bandwidth, a change in the position of the bandwidth, or a change in the SCS of the bandwidth.

For example, the bandwidth may be reduced during a time period of low activity in order to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow a different service. A subset of the total cell bandwidth of a cell may be referred to as a BWP. BA may be implemented by configuring BWPs for the UE and indicating a current active BWP among the configured BWPs to the UE by the BS/network.

Figure 15:
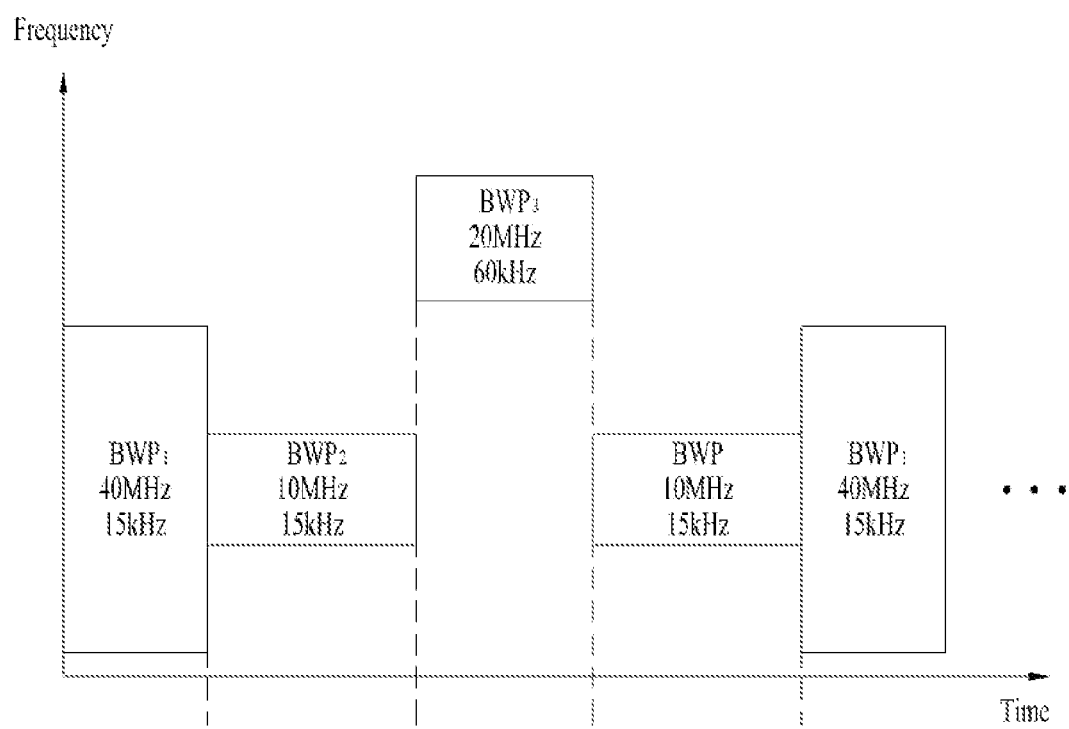
FIG. 15 is a diagram illustrating a plurality of bandwidth parts (BWPs) according to an embodiment of the present disclosure.

FIG. 15 illustrates a plurality of BWPs according to an embodiment of the present disclosure.

Referring to FIG. 15, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 16:
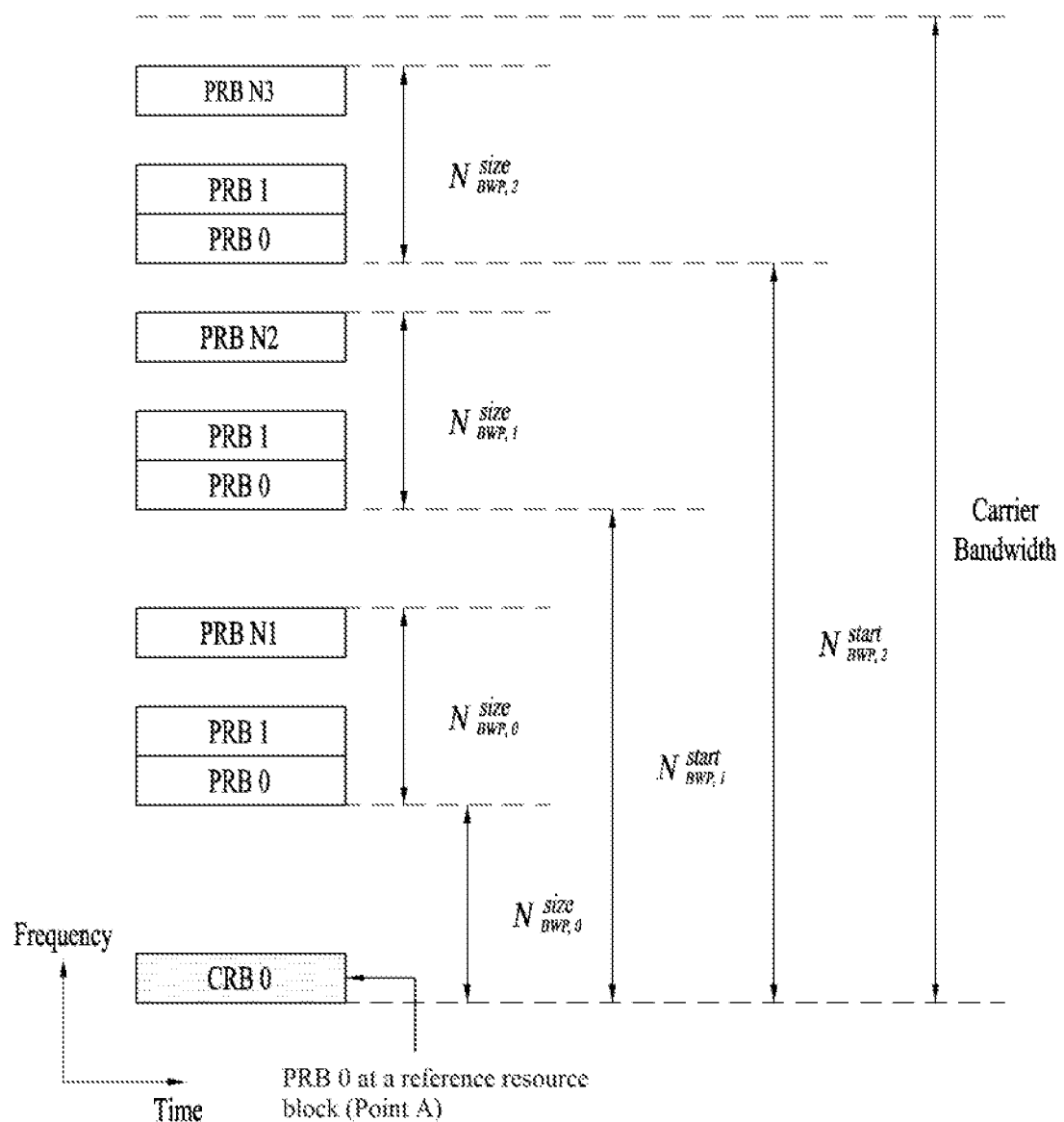
FIG. 16 is a diagram illustrating a BWP according to an embodiment of the present disclosure.

FIG. 16 illustrates BWPs according to an embodiment of the present disclosure. In the embodiment of FIG. 16, it is assumed that there are three BWPs.

Referring to FIG. 16, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset $N_{startBWP}$ from the point A, and a bandwidth $N_{sizeBWP}$. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

Embodiment

In NR Uu (an operation between base station and terminal) communication, a beam management operation at mmWave frequencies is newly introduced. The beam management operation may include beam scheduling, beam selection, and beam failure recovery. While a UE and an eNB communicate with each other through a beam selected between a V2X UE and the eNB, when a problem occurs in the selected beam (i.e., in the case of beam failure), sidelink communication between V2X UEs may also be affected. In addition, when a problem occurs in a radio link state between the V2X UE and the eNB (i.e., when radio link failure radio link failure is declared or detected), sidelink communication between V2X UEs may also be affected. In more detail, the V2X UE may determine that there is a problem in a radio link state with the eNB. The V2X UE may monitor radio link with the eNB and, when determining that the radio link is in a state in which communication is impossible, the V2X UE may detect or declare the radio link failure (RLF). For example, the UE may detect the RLF when continuously receiving an OUT OF SYNC instruction from a physical layer N times. The UE may declare the RLF when the UE does not receive a continuous IN SYNC instruction for a predetermined time (e.g., T310 timer period) or does not receive a continuous OUT OF SYNC instruction for a predetermined time after detecting the RLF.

To explain again, when beam failure or radio link failure occurs between the eNB and the V2X UE, a problem may occur in communication between the eNB and the UE. When the V2X UE receives a signal from the eNB and uses the signal in sidelink communication with another UE, if beam failure or radio link failure occurs between the eNB and the V2X UE, sidelink communication may also be adversely affected.

In the following description, the operation of the UE corresponding to beam failure or beam failure recovery operations may be applied to an operation of a UE in any situation (e.g., detection or declaration of radio link failure) in which a problem occurs in a radio link between the eNB and the UE. That is, the present disclosure is not limited to the case in which beam failure occurs and may be applied to any situation (e.g., detection or declaration of radio link failure) in which a problem occurs in radio link between the UE and the eNB.

It may be assumed that the V2X UE receives resource allocation from the eNB using a resource allocation mode 1 method (e.g., mode 1 dynamic scheduling) and performs sidelink communication. When beam failure occurs in a beam selected by the UE in Uu link between the UE and the eNB, the UE may perform a beam failure recovery operation. During a beam failure recovery period, a problem may occur in that the UE is not capable of normally performing a mode 1 resource allocation request (i.e., SR/BSR procedure) for sidelink communication with the eNB. In addition, due to failure of a previous beam being used, a problem may occur in that a sidelink resource request is not capable of being performed to the eNB until the UE selects a new beam through a beam failure recovery process.

In this case, the UE may be switched to a mode 2 resource usage mode to perform sidelink communication in order to temporarily use a mode 2 resource (Tx Exceptional Pool) during a beam failure recovery period. In this case, conventionally, when the UE uses the Tx Exceptional Pool, a resource may be selected from the Tx Exceptional Pool based on random selection.

Figure 17:
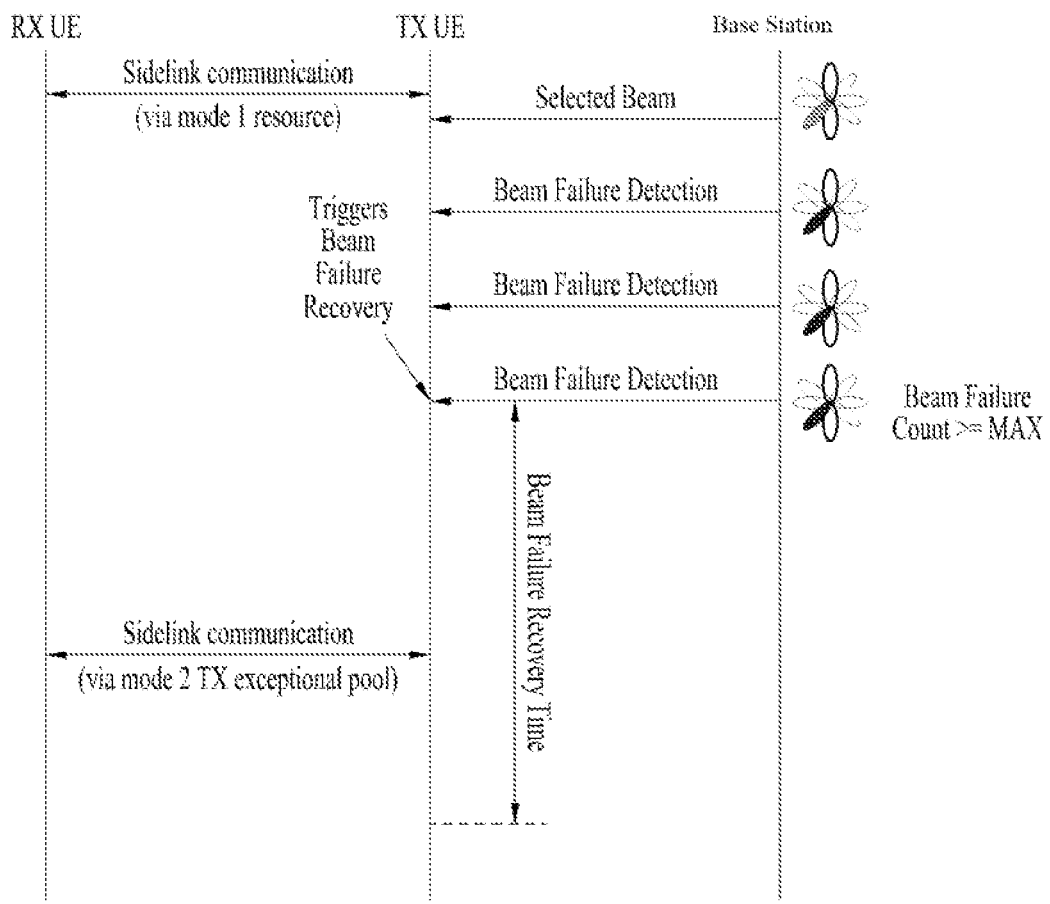
FIG. 17 is a diagram for explaining an operation of a general UE when beam failure occurs in a V2X UE that currently operates in a resource allocation mode 1.

FIG. 17 is a diagram for explaining an operation of a general UE when beam failure occurs in a V2X UE that currently operates in a resource allocation mode 1.

A V2X transmission UE that currently operates using a resource allocation mode 1 method may perform Uu communication with the eNB through a selected beam. When the transmission terminal detects beam failure of Uu link continuously (more than the maximum value), the beam failure recovery process may begin. The transmission UE may be switched to resource allocation mode 2 during a beam failure recovery period and may perform sidelink communication using Tx Exceptional Pool (mode 2 resource) based on random selection.

However, when the UE is capable of using a mode 2 resource (TX Exceptional Pool or TX Normal Pool), TX Normal Pool based on sensing may be used instead of TX Exceptional Pool based on random selection.

This is because a sensing result is not applied to the TX Exceptional Pool based on random selection since the UE randomly selects a resource. Thus, there is a possibility that the UE is not capable of using an idle resource sufficiently. Accordingly, it may be more advantageous in terms of performance in sidelink communication to use a mode 2 resource based on sensing than a mode 1 resource selection method based on random selection.

Accordingly, as follows, the present disclosure proposes a method of using a resource selection method based on sensing during use of a mode 2 resource for a beam failure recovery period when the V2X transmission UE detects beam failure of Uu link and uses a mode 1 resource. In addition, the following proposal may also be applied to the case in which the V2X transmission UE that has operated in a resource allocation mode 1 detects or declares radio link failure with the eNB and the case in which the V2X transmission UE is switched to a resource allocation mode 2 and uses a resource based on a resource.

In the following description, the TX Exceptional Pool will be described as a random selection-based resource, a random selection-based sidelink resource, a random selection-based mode 2 resource, or the like. The TX Normal Pool will be described as a sensing-based resource, a sensing-based sidelink resource, a sensing-based mode 2 resource, or the like.

The following proposals may be applied independently or may be applied simultaneously in one embodiment.

Proposal 1. Sensing Operation Based on Long Term Sensing or Short Term Sensing

It may be proposed to operate by applying different validity determination references of a sensing result depending on a sensing type (long term sensing or short term sensing) when the V2X transmission UE detects beam failure of Uu link and is not capable of using a mode 1 resource during a beam failure recovery period and needs to perform a sensing operation in order to use a "mode 2resource based on sensing". The validity determination reference may be a reference time used for the transmission UE to determine that a resource is valid only when sensing is performed for a predefined time.

For example, in the case of a mode 2 resource selection method based on long term sensing, a validity determination reference may be defined to determine a corresponding sensing result to be valid only when the transmission UE performs sensing during the minimum time "M" or more. In the case of a mode 2 resource selection method based on short term sensing, the validity determination reference may be defined to determine a corresponding sensing result to be valid only when the transmission UE performs sensing during the minimum time "N" or more. In this case, the validity determination reference may be defined in such a way that the time N is less than M (N<M). That is, the validity determination reference may be defined to determine a sensing result to be valid even if a sensing time applied to short term sensing is shorter than a sensing time applied to long term sensing. That is, the validity determination reference of the sensing result may be defined to be different depending on the long term sensing and the short term sensing.

For example, long term sensing or short term sensing may be applied according to a type of a UE. In more detail, a type of a UE that is sensitive to power consumption may be set to perform short term sensing and a type of a UE that is not sensitive to power consumption may be set to perform long term sensing. Thus, different sensing types for selecting a resource of a resource allocation mode 2 may be set according to the power sensitivity of the UE, power and resources of the UE may be efficiently used.

According to another embodiment, long term sensing or short term sensing may be classified and applied according to a latency requirement or packet delay budget (PDB) of a sidelink packet or sidelink data transmitted by a UE. In more detail, the UE may perform short term sensing when transmitting a packet having short latency requirement or PDB. In addition, the UE may perform long term sensing when transmitting a packet having long latency requirement or PDB. Thus, the UE may set different sensing types for selecting resources of a resource allocation mode 2 depending on the characteristics of a sidelink packet transmitted by the UE, and accordingly, may perform sensing suitable for latency requirements or PDB of the sidelink packet transmitted by the UE.

Proposal 2. Sensing Operation in Consideration of Latency Budget of Sidelink Packet A UE needs to perform sensing during a predefined sensing validity reference time (a long term sensing validity period or a short term sensing validity period). In this case, the sensing validity reference time may be a reference by which the transmission UE is capable of determining that the sensing result is valid to use "mode 2 TX Normal Pool resource". Simultaneously, the UE may determine whether a corresponding sensing operation is completely performed within a sidelink packet latency budget from the transmission UE and may perform a sensing operation only when possible. In addition, the UE may determine whether a sidelink packet is completely transmitted within a latency budget using a resource pool based on sensing after completing sensing and may perform the sensing operation only when possible. Here, the latency budget refers to an upper limit of an allowable delay time of corresponding sidelink data. That is, the UE needs to receive sidelink data from a higher layer and to transmit the received sidelink data to another UE within the latency budget. In addition, different latency budgets may be required for each sidelink data.

In other words, the transmission UE may determine whether sensing is completed within the latency budget of the sidelink data or whether the sidelink data is completely transmitted after sensing and may use TX Normal Pool based on sensing only when possible. In contrast, when this is not possible, the TX Exceptional Pool based on random selection may be used. Thus, according to the present proposal, the transmission UE may be prevented from performing an unnecessary sensing operation, and when a sensing operation is possible, a sensing-based resource may be used to prevent resource collision.

In proposals 3 and 4 below, detailed embodiments of proposals 1 and 2 will be described. In more detail, hereinafter, proposals 1 and 2 may be applied to propose a reference for determining whether the UE uses "mode 2 TX Exceptional Pool" or "mode 2 TX Normal Pool" during Uu beam failure recovery or radio link failure.

Proposal 3. Embodiment in which Transmission UE Uses Mode 2 TX Normal Pool Based on Sensing The present proposal may be applied to the case in which the V2X transmission UE detects beam failure of Uu link and is not capable of using a mode 1 resource and thus needs to use a mode 2 resource during beam failure recovery. In addition, the present proposal may be applied to the case in which radio link failure between a transmission UE and an eNB is detected or declared. For example, when the transmission UE performs sensing during a validity determination reference of long term sensing or short term sensing according to the aforementioned proposal 1 and completely performs sensing within a latency budget of sidelink data, the transmission UE may use "sensing-based mode 2 resource" without using "mode 2 TX Exception Pool" based on random selection during beam failure recovery. In addition, when determining that a sidelink packet is capable of being completely transmitted within a latency budget using a sensing-based resource pool after sensing is completed, the transmission UE may transmit a sidelink packet using a TX Normal Pool based on sensing.

Figure 18:
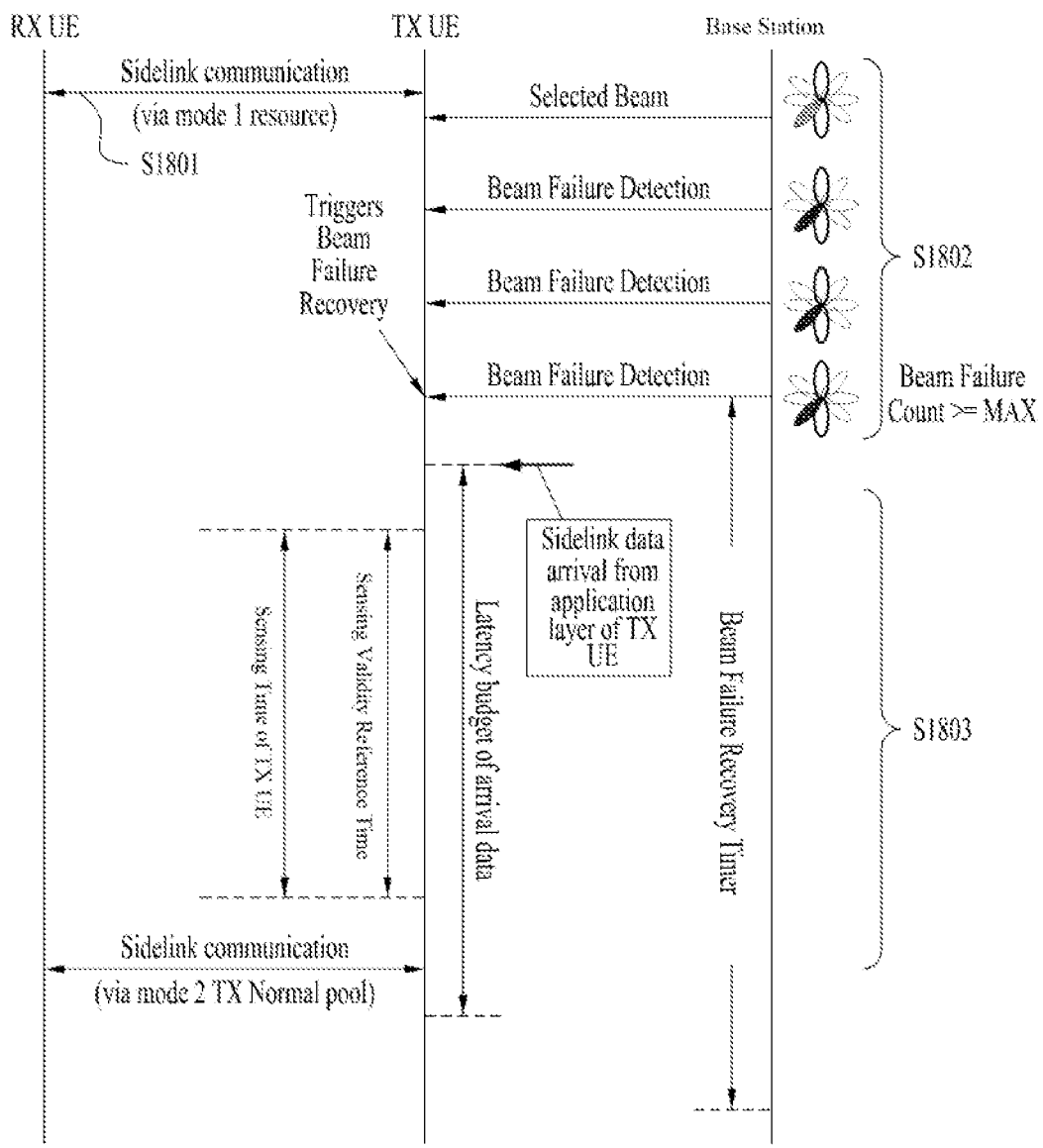
FIG. 18 is a diagram for explaining an embodiment in which a transmission UE uses a mode 2 TX Normal Pool based on sensing.

FIG. 18 is a diagram for explaining an embodiment in which a transmission UE uses a mode 2 TX Normal Pool based on sensing.

Referring to FIG. 18, when the transmission UE detects beam failure of Uu link continuously (more than the maximum value) and starts a beam failure recovery process, the transmission UE may perform sidelink communication using "sensing-based TX Normal Pool (mode 2 resource)" during beam failure recovery. When the Uu beam failure recovery process begins, the transmission UE may perform sensing by a time of "sensing validity determination reference of TX Normal Pool" proposed in the present disclosure, and when sensing is completed within a latency budget of sidelink data, the transmission UE may perform sidelink communication using "mode 2 TX Normal Pool" (selecting and using TX Normal Pool based on sensing) during a beam failure recovery process. In addition, the current case may be the case in which the transmission UE is set to use short term sensing.

In more detail, in step S1801, the transmission UE may operate in a resource allocation mode 1 to receive allocation of a sidelink resource from an eNB and to perform sidelink communication.

In step S1802, the transmission UE may communicate with the eNB through the selected beam and may detect beam failure. When the transmission UE detects beam failure equal to or greater than a threshold, a beam failure recovery process may be started. According to another embodiment, the transmission UE may determine the state of radio link with the eNB and may detect or declare radio link failure. When the UE detects radio link failure equal to or greater than a threshold or declares radio link failure, the UE may start a radio link failure recovery process.

In step S1803, when receiving sidelink data from a higher layer, the UE may perform sensing during a sensing validity reference time within a latency budget of the received sidelink data and may determine whether sidelink communication is capable of being performed. That is, the UE may determine whether TX Normal Pool based on sensing is capable of being used within the latency budget of the sidelink data. For example, the UE may compare a latency budget end time with a data transfer completion time using the TX Normal Pool based on sensing and may determine whether to use TX Normal Pool based on sensing or TX Exception Pool based on random selection. When the UE performs sensing during the sensing validity reference time within the latency budget of the sidelink data and determine that sidelink communication is possible, the UE may perform sensing during the sensing validity reference time and may perform sidelink communication using the TX Normal Pool based on the sensing result.

Proposal 4. Embodiment in which Transmission UE Uses Mode 2 TX Exception Pool Based on Random Selection The present proposal may be applied to the case in which the V2X transmission UE detects beam failure of Uu link and is not capable of using a mode 1 resource and thus needs to use a mode 2 resource during beam failure recovery. In addition, the present proposal may be applied to the case in which radio link failure between a transmission UE and an eNB is detected or declared. For example, when the transmission UE performs sensing during a validity determination reference of long term sensing or short term sensing according to the aforementioned proposal 1 and does not completely perform sensing within a latency budget of sidelink data, the transmission UE may use "mode 2 TX Exception Pool" based on random selection during beam failure recovery. In addition, when determining that a sidelink packet is not capable of being completely transmitted within a latency budget using a sensing-based resource pool after sensing is completed, the transmission UE may transmit a sidelink packet using the "mode 2 TX Exception Pool" based on random selection.

Figure 19:
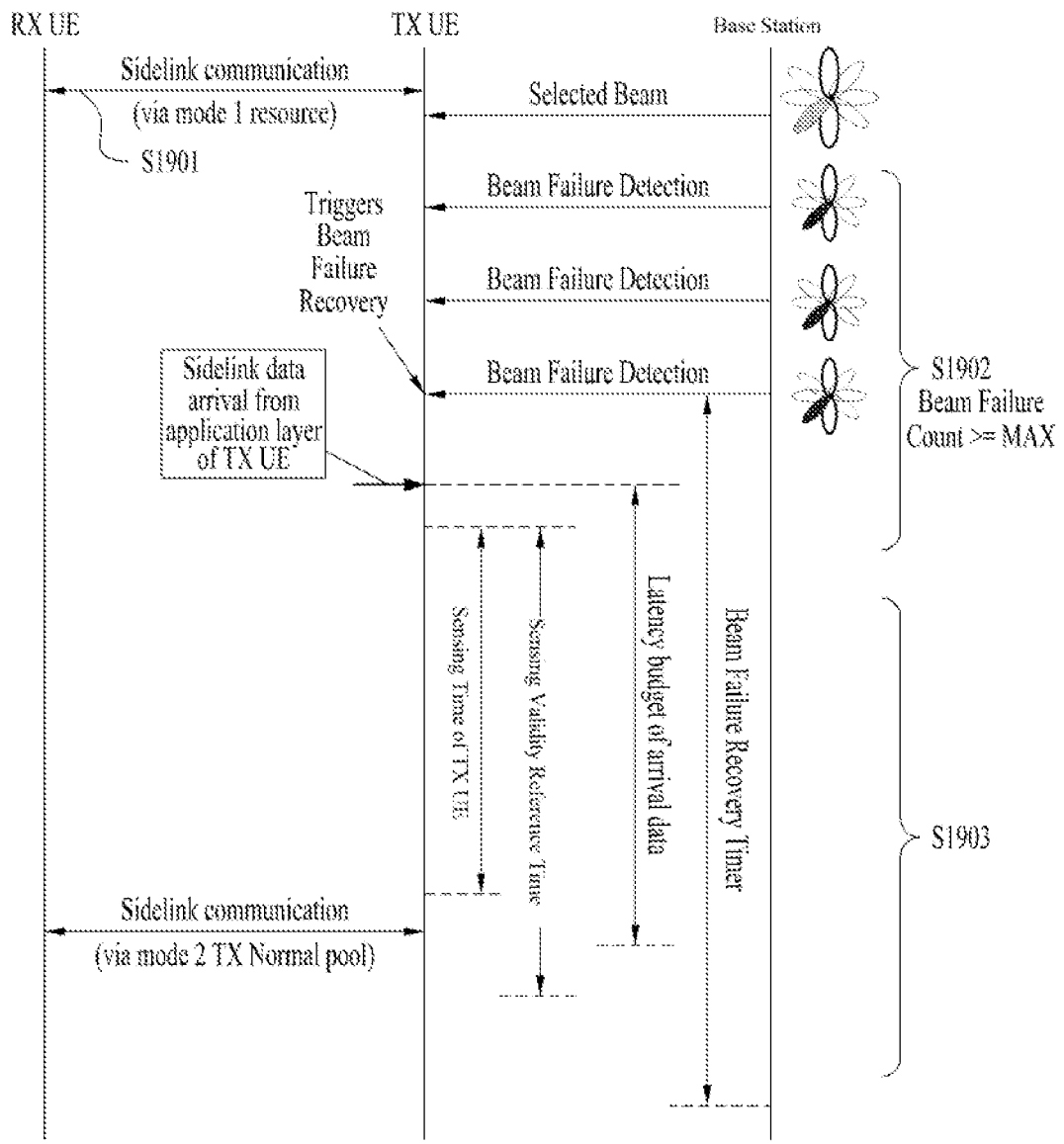
FIG. 19 is a diagram for explaining an embodiment in which a transmission UE uses a mode 2 TX Exception Pool based on random selection.

FIG. 19 is a diagram for explaining an embodiment in which a transmission UE uses a mode 2 TX Exception Pool based on random selection.

Referring to FIG. 19, when the transmission UE detects beam failure of Uu link continuously (more than the maximum value) and starts a beam failure recovery process, the transmission UE may perform sidelink communication using "sensing-based TX Exception Pool (mode 2 resource)" during beam failure recovery. When the Uu beam failure recovery process begins, the transmission UE may determine whether the TX Normal Pool based on sensing is capable of being used within latency budget of sidelink data. When determining that the TX Normal Pool based on sensing is not capable of being used, the transmission UE may use the mode 2 TX Exception Pool based on random selection. For example, when the transmission UE is not capable of performing resource sensing by a time of the aforementioned "sensing validity determination reference of TX Normal Pool" (e.g., when the transmission UE is not capable of performing sensing by the validity reference time because latency budget is exceeded when sensing is performed by the sensing validity reference time), the transmission UE may use "mode 2 TX Exceptional Pool" during a beam failure recovery process. That is, the transmission UE may randomly select a resource from the TX Exceptional Pool and may perform sidelink communication.

In more detail, in step S1901, the transmission UE may operate in a resource allocation mode 1 to receive allocation of a sidelink resource from an eNB and to perform sidelink communication.

In step S1902, the transmission UE may communicate with the eNB through the selected beam and may detect beam failure. When the transmission UE detects beam failure equal to or greater than a threshold, a beam failure recovery process may be started. According to another embodiment, the transmission UE may determine the state of radio link with the eNB and may detect or declare radio link failure. When the UE detects radio link failure equal to or greater than a threshold or declares radio link failure, the UE may start a radio link failure recovery process.

In step S1903, when receiving sidelink data from a higher layer, the UE may perform sensing during a sensing validity reference time within latency budget of the received sidelink data and may determine whether sidelink communication is capable of being performed. That is, the UE may determine whether TX Normal Pool based on sensing is capable of being used within the latency budget of the sidelink data. For example, the UE may compare a latency budget end time with a data transfer completion time using the TX Normal Pool based on sensing and may determine whether to use TX Normal Pool based on sensing or TX Exception Pool based on random selection. When the UE performs sensing during the sensing validity reference time within the latency budget of the sidelink data and determine that sidelink communication is not possible, the UE may perform sidelink communication using the TX Exception Pool. Although FIG. 19 illustrates the case in which a first UE performs sensing during a predetermined period and then uses a resource using the TX Exception Pool, sidelink data may be transmitted using the TX Exception Pool without performing sensing during a predetermined period.

Figure 20:
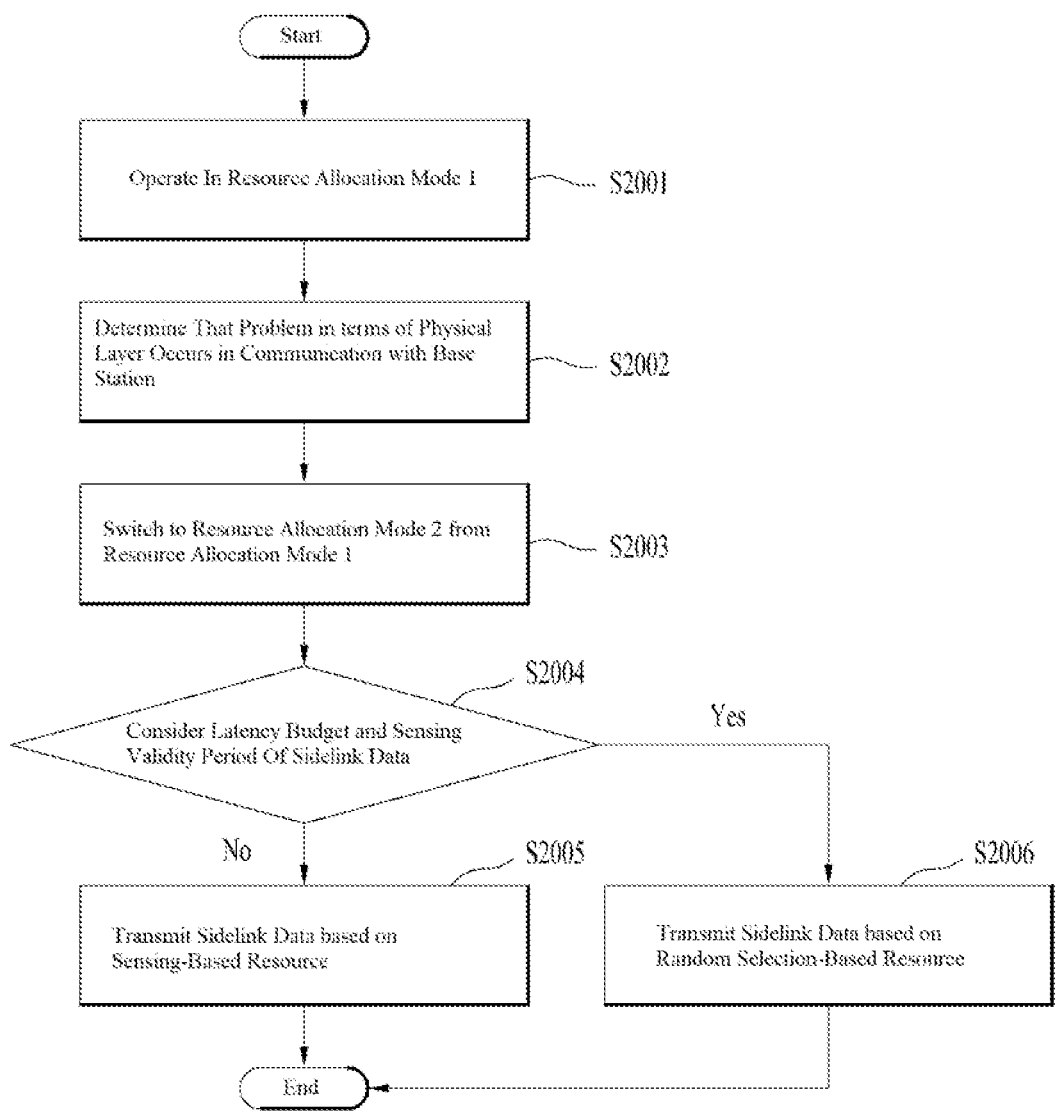
FIG. 20 is a flowchart for explaining embodiments of the present disclosure.

FIG. 20 is a flowchart for explaining embodiments of the present disclosure.

Referring to FIG. 20, in step S2001, a first UE may operate in a resource allocation mode 1 to receive allocation of a sidelink resource from an eNB and to perform sidelink communication with a second UE.

In step S2002, the first UE may determine that a problem in terms of a physical layer occurs in communication with an eNB. For example, when beam failure equal to or greater than a threshold is detected, it may be determined that a problem in terms of a physical layer occurs. According to another embodiment, when radio link failure with an eNB is detected or declared, it may be determined that a problem in terms of a physical layer occurs.

In step S2003, the first UE may be switched to a resource allocation mode 2 from a resource allocation mode 1. A problem in terms of a physical layer in communication with an eNB occurs, and thus the first UE may not smoothly receive allocation of a sidelink resource based on the resource allocation mode 1 from the eNB. Thus, the first UE may be switched to the resource allocation mode 2 using the sidelink resource via direct sensing or selection using a resource poll allocated from the eNB. Conventionally, the first UE may be switched to the resource allocation mode 2 and may use only a random selection-based resource.

In step S2004, the first UE may determine whether a sensing-based resource is used or a random selection-based resource is selected in consideration of a latency budget and a sensing validity period of a sidelink packet. For example, the sensing-based resource may be the aforementioned resource allocation mode 2 TX Normal Pool, and the random selection-based resource may be the aforementioned resource allocation mode 2 TX Exception Pool.

In more detail, the first UE may receive sidelink data from a higher layer, and for the received sidelink data, a latency budget, which is the maximum delay time for effectively transmitting the data, may be set. Information on the latency budget may be transferred in a higher layer along with the sidelink data. The first UE may determine whether the received sidelink data is transferred using the sensing-based resource within the latency budget. When determining that the sensing-based resource is used, the first UE may transmit sidelink data using the sensing-based resource (step S2005).

When determining that the sensing-based resource is not capable of being used, the first UT may transmit sidelink data using a random selection-based resource (step S2006).

In more detail, when an available transmission time after sensing during a sensing validity period is within the latency budget, the first UE may transmit sidelink data using the sensing-based resource. When the available transmission time after sensing during a sensing validity period is after the latency budget, the first UE may transmit the sidelink data using the random selection-based resource. In this case, the sensing validity period may be any one of a short term sensing validity period or a long term sensing validity period. The short term sensing validity period may be shorter than the long term sensing validity period. When the short term sensing validity period is set to the first UE, the first UE may use a corresponding resource in sidelink transmission even if the corresponding resource is valid during a shorter period than in the case in which the long term sensing validity period is set. When the power sensitivity of the first UE is high, the short term sensing validity period may be set to reduce power consumption. Thus, according to the present embodiment, power and resource selection of the UE may be effectively performed.

According to embodiment(s) of the present disclosure, the embodiment(s) may be applied when the V2X transmission UE detects beam failure or radio link failure continuously (the maximum value) in Uu link with the eNB and a beam failure recovery process or a radio link failure recovery process of Uu link is performed. The "mode 2 TX Normal Pool" may be used instead of use of "mode 2 TX Exceptional Pool" as long as the conditions proposed in the present disclosure is satisfied when the transmission UE performs sidelink communication. As such, due to use of the TX Exceptional Pool based on random selection, a situation in which the UE selects a resource that is not idle (in this case, resource collision occurs because another transmission UE also randomly selects the same resource) may be prevented. That is, according to the embodiment(s) of the present disclosure, the first UE may check that the resource is idle based on sensing and may select the resource, and thus may avoid resource collision that may occur based on random selection.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
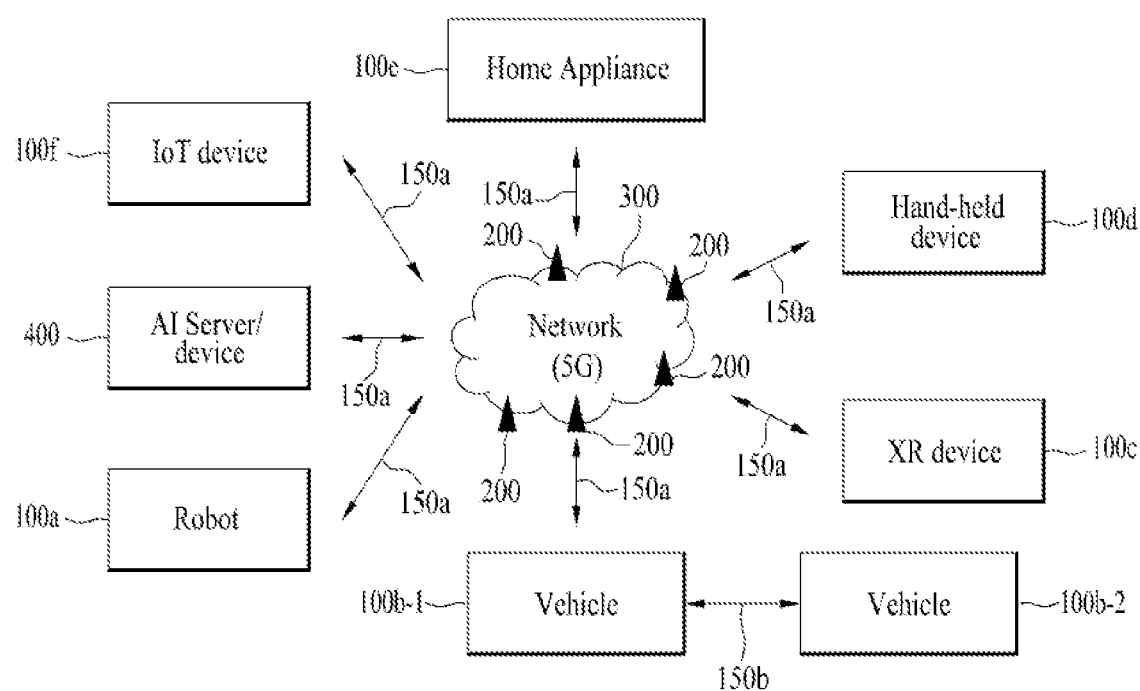
FIG. 21 illustrates a communication system 1 applied to the present disclosure.

FIG. 21 illustrates a communication system 1 applied to the present disclosure.

Referring to FIG. 21, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

Figure 23:
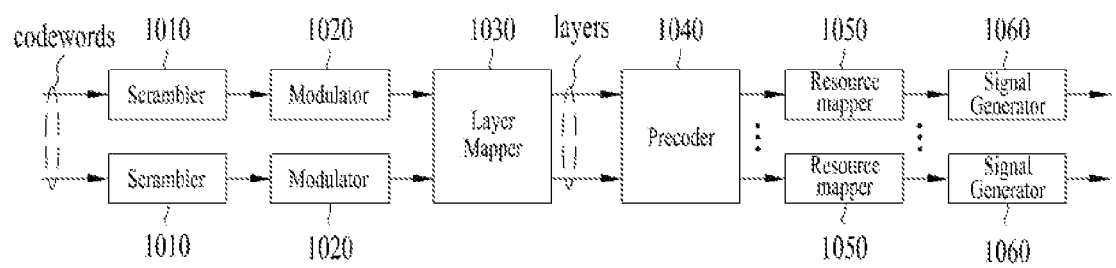
FIG. 23 illustrates a signal process circuit for a transmission signal.

FIG. 23 illustrates a signal process circuit for a transmission signal.

Referring to FIG. 23, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 23 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 44. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

Figure 24:
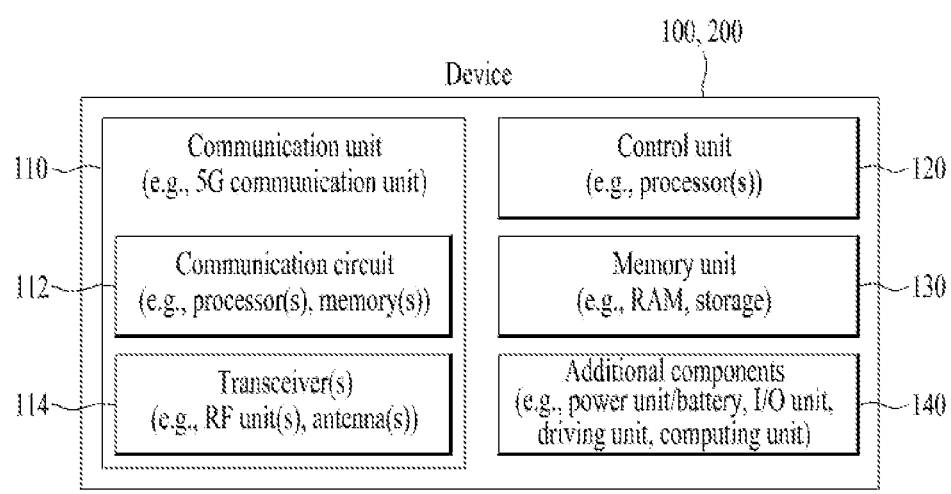
FIG. 24 illustrates another example of a wireless device applied to the present disclosure.

FIG. 24 illustrates another example of a wireless device applied to the present disclosure. The wireless device may be implemented in various forms according to a use-case/service (refer to FIG. 21).

Referring to FIG. 24, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 41. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a FinTech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 24 will be described in detail with reference to the drawings.

Examples of a Hand-Held Device Applicable to the Present Disclosure

Figure 25:
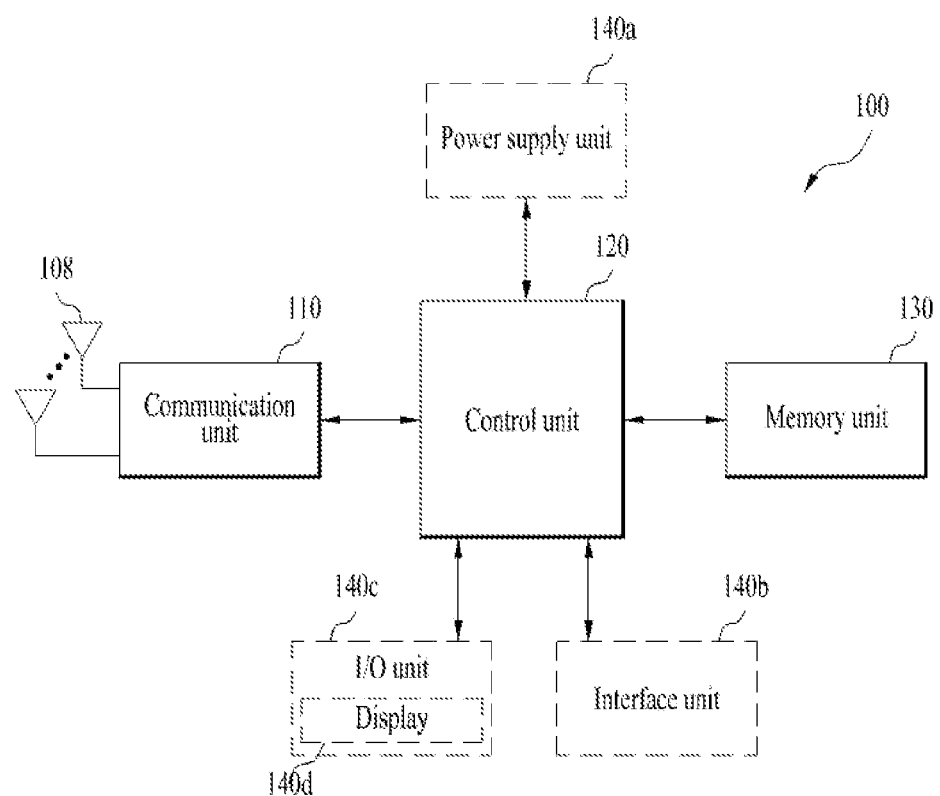
FIG. 25 illustrates a hand-held device applied to the present disclosure.

FIG. 25 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 42, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
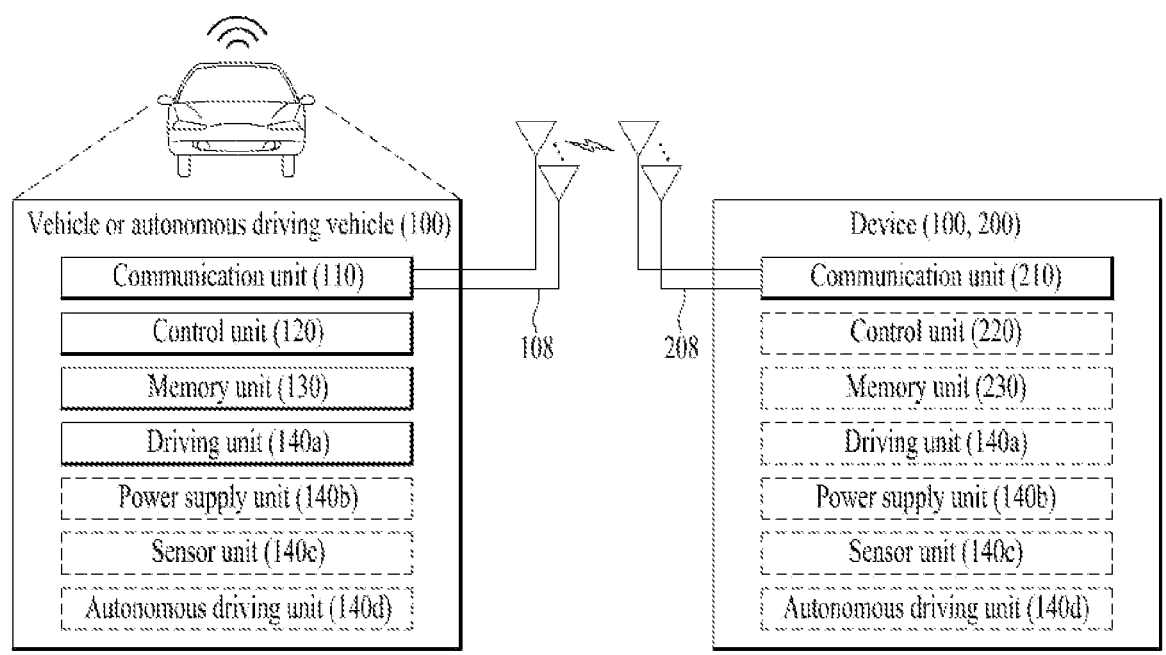
FIG. 26 illustrates a vehicle or an autonomous driving vehicle applied to the present disclosure.

Examples of a Vehicle or an Autonomous Driving Vehicle Applicable to the Present Disclosure FIG. 26 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 27:
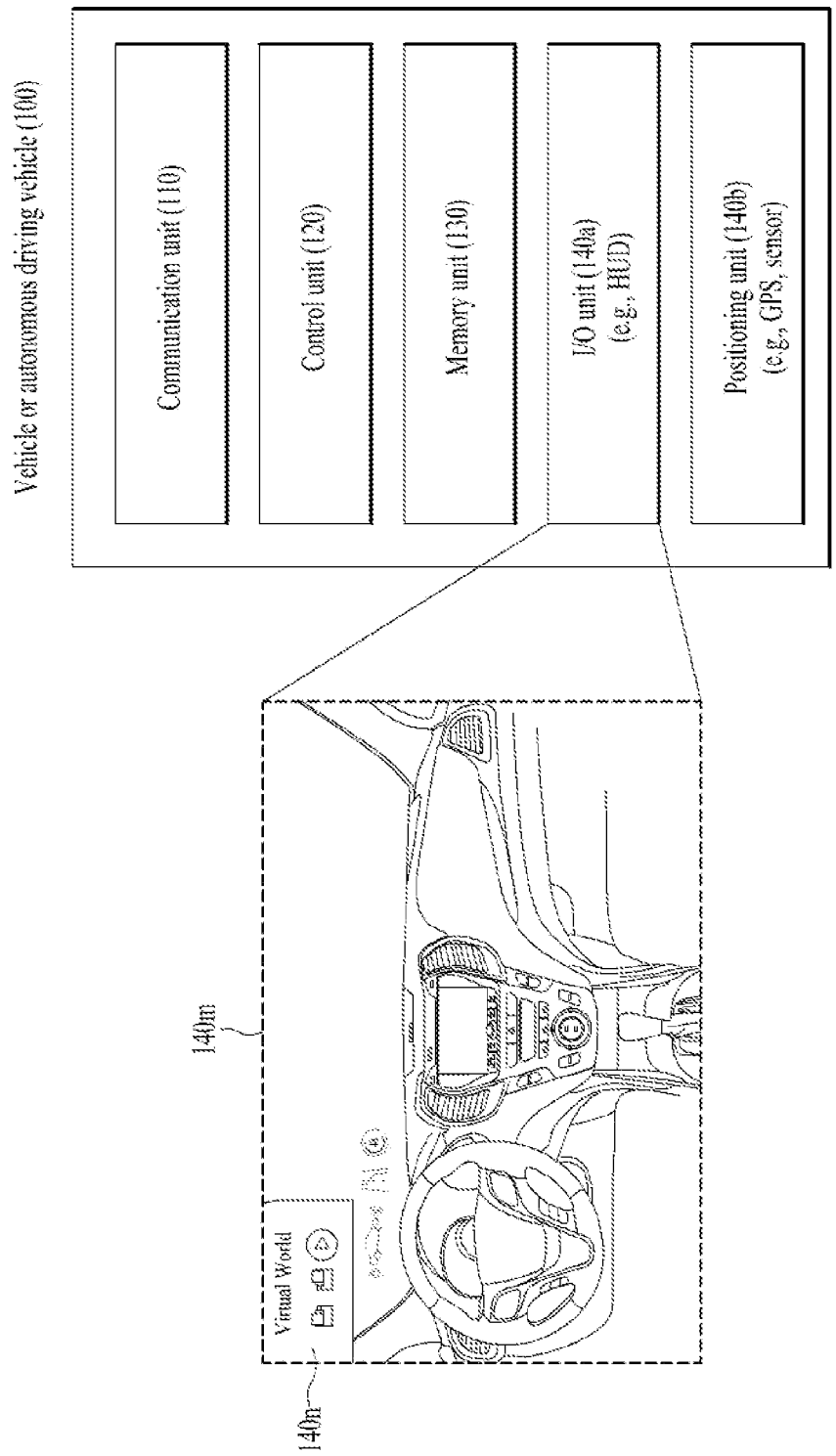
FIG. 27 illustrates a vehicle applied to the present disclosure.

FIG. 27 illustrates a vehicle applied to the present disclosure. The vehicle may be implemented as a transport means, an aerial vehicle, a ship, etc.

Referring to FIG. 27, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 24.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 28:
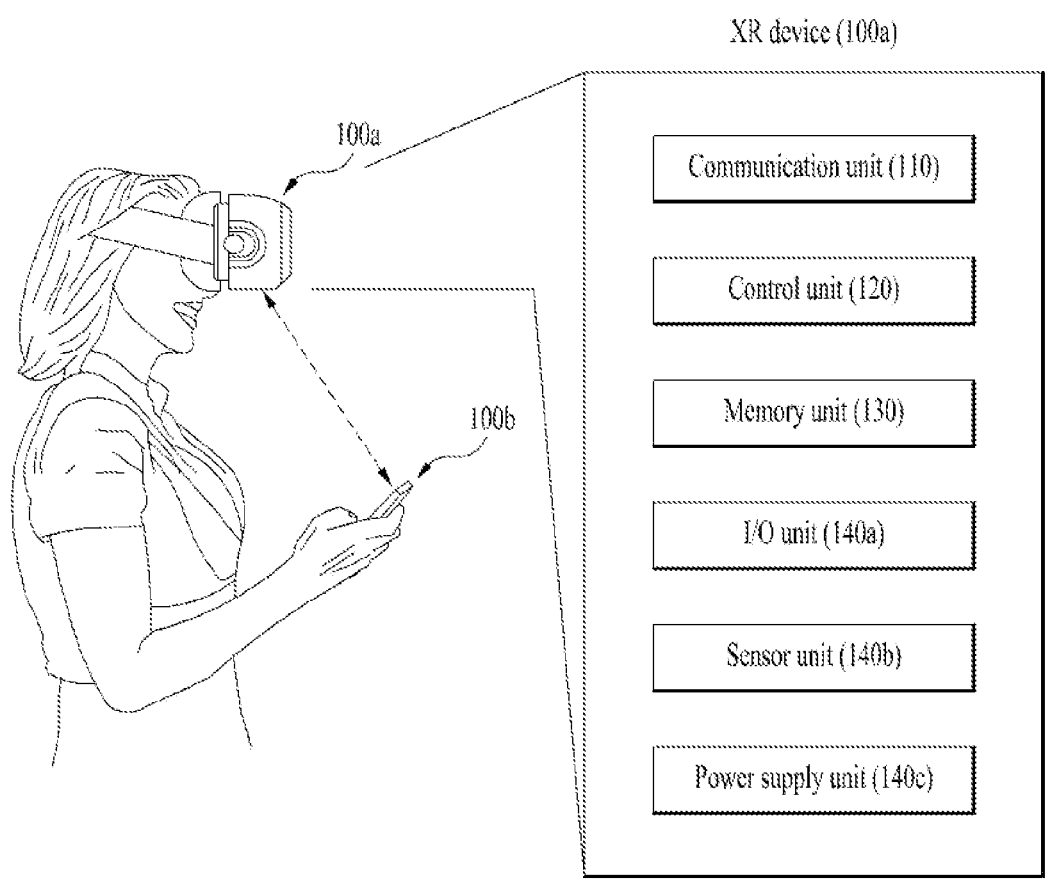
FIG. 28 illustrates an XR device applied to the present disclosure.

FIG. 28 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 28, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 28, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100a. For example, the control unit 120 may be configured to control and/or perform procedures such as video/image acquisition, (video/image) encoding, and metadata generation and processing. The memory unit 130 may store data/parameters/programs/code/commands needed to drive the XR device 100a/generate XR object. The I/O unit 140a may obtain control information and data from the exterior and output the generated XR object. The I/O unit 140a may include a camera, a microphone, a user input unit, a display unit, a speaker, and/or a haptic module. The sensor unit 140b may obtain an XR device state, surrounding environment information, user information, etc. The sensor unit 140b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140c may supply power to the XR device 100a and include a wired/wireless charging circuit, a battery, etc.

For example, the memory unit 130 of the XR device 100a may include information (e.g., data) needed to generate the XR object (e.g., an AR/VR/MR object). The I/O unit 140a may receive a command for manipulating the XR device 100a from a user and the control unit 120 may drive the XR device 100a according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 29:
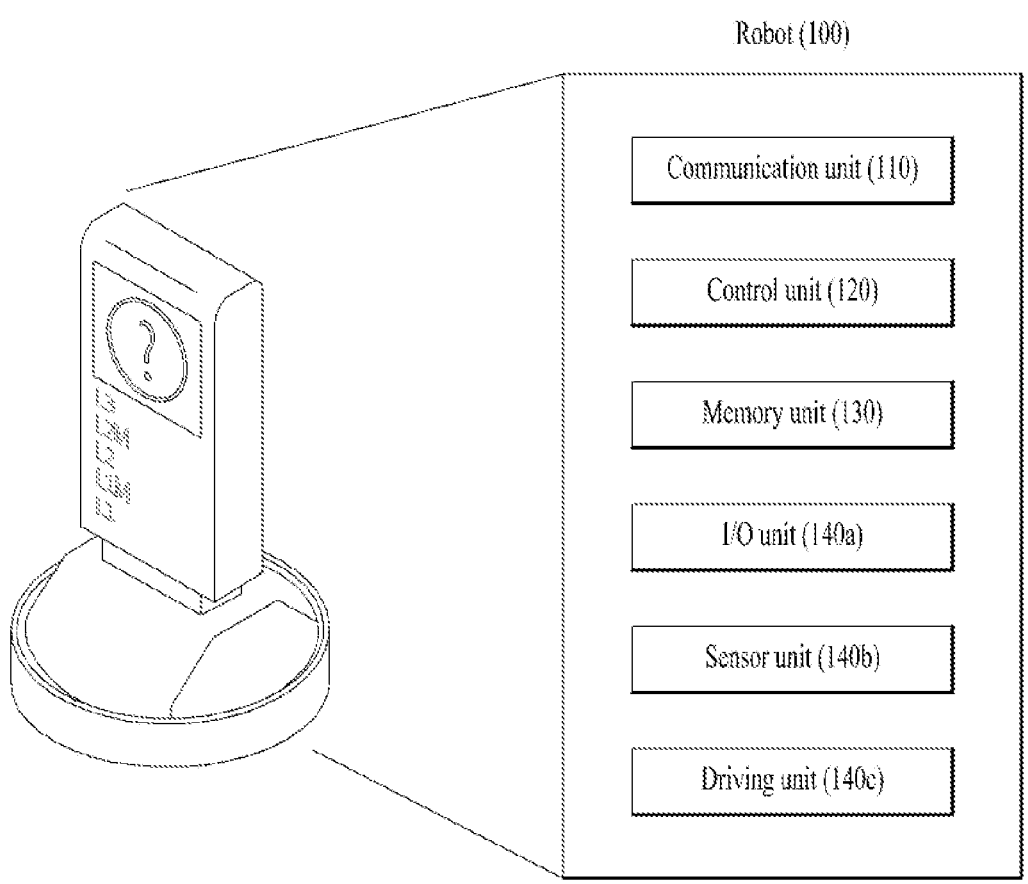
FIG. 29 illustrates a robot applied to the present disclosure.

FIG. 29 illustrates a robot applied to the present disclosure. The robot may be categorized into an industrial robot, a medical robot, a household robot, a military robot, etc., according to a used purpose or field.

Referring to FIG. 29, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 24, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Example of AI Device Applicable to the Present Disclosure

Figure 30:
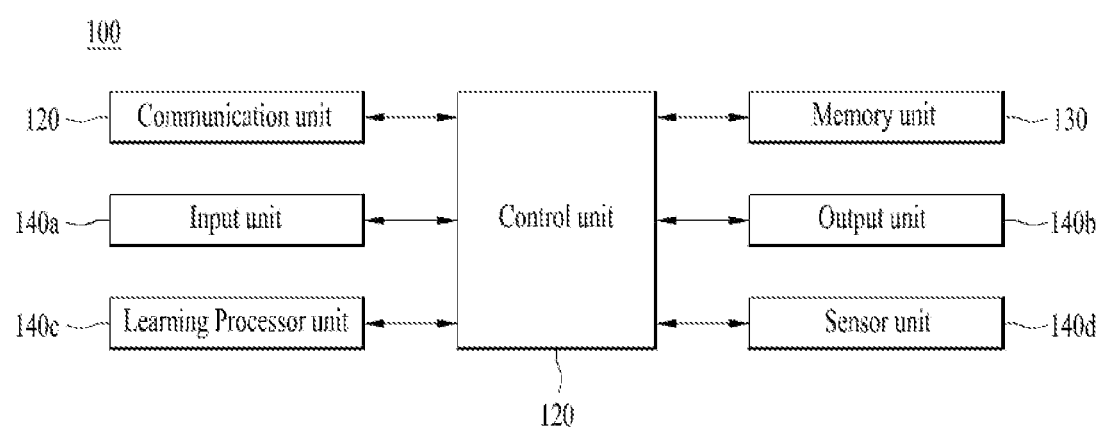
FIG. 30 illustrates an AI device applied to the present disclosure.

FIG. 30 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 30, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 43, respectively.

The communication unit 110 may transmit and receive wired/radio signals (e.g., sensor information, user input, learning models, or control signals) to and from external devices such as other AI devices (e.g., 100*x*, 200, or 400 of FIG. 21) or an AI server (e.g., 400 of FIG. 21) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 21). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140*a* may acquire various types of data from the exterior of the AI device 100. For example, the input unit 140*a* may acquire learning data for model learning, and input data to which the learning model is to be applied. The input unit 140*a* may include a camera, a microphone, and/or a user input unit. The output unit 140*b* may generate output related to a visual, auditory, or tactile sense. The output unit 140*b* may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140*c* may learn a model consisting of artificial neural networks, using learning data. The learning processor unit 140*c* may perform AI processing together with the learning processor unit of the AI server (400 of FIG. 21). The learning processor unit 140*c* may process information received from an external device through the communication unit 110 and/or information stored in the memory unit 130. In addition, an output value of the learning processor unit 140*c* may be transmitted to the external device through the communication unit 110 and may be stored in the memory unit 130.

INDUSTRIAL APPLICABILITY

The above-described embodiments of the present disclosure are applicable to various mobile communication systems.

What is claimed is:

1. A method of performing an operation for a first terminal in a wireless communication system, the method comprising:
switching to a resource allocation mode 2 from a resource allocation mode 1 based on a detection of a beam failure or a declaration of a radio link failure for a base station,
wherein the resource allocation mode 1 is a mode that a transmission resource for a second terminal is determined by the base station, and the resource allocation mode 2 is a mode that the transmission resource for the second terminal is determined by the first terminal; and
transmitting data to the second terminal on a resource selected in a resource pool for the resource allocation mode 2,
wherein, based on a first time period being equal to or greater than a second time period, the resource is selected by a sensing procedure for determining the resource is occupied by a second terminal,
wherein, based on the first time period being less than the second time period, the resource is randomly selected, and
wherein the first time period is a maximum limit period for transmitting the data and the second time period is an estimated period required for transmitting the data after the sensing procedure.

2. The method of claim 1, further comprising:
starting a timer for recovery of the beam failure or the radio link failure,
wherein the data is transmitted while the timer is running.

3. A first terminal in a wireless communication system, comprising:
at least one processor; and
at least one computer memory operatively connected to the at least one processor and configured to store commands for allowing the at least one processor to perform operations when being executed,
wherein the operations includes:
switching to a resource allocation mode 2 from a resource allocation mode 1 based on a detection of a beam failure or a declaration of a radio link failure for a base station,
wherein the resource allocation mode 1 is a mode that a transmission resource for a second terminal is determined by the base station, and the resource allocation mode 2 is a mode that the transmission resource for the second terminal is determined by the first terminal; and
transmitting data to the second terminal on a resource selected in a resource pool for the resource allocation mode 2, and
wherein, based on a first time period being equal to or larger than a second time period, the resource is selected by a sensing procedure for determining the resource is occupied by a second terminal,
wherein, based on the first time period being smaller than the second time period, the resource is randomly selected, and
wherein the first time period is a maximum limit period for transmitting the data and the second time period is an estimated period required for transmitting the data after the sensing procedure.

4. The first terminal of claim 3, wherein the first terminal is a terminal communicating with at least one of another terminal, a terminal related to autonomous vehicle, a base station, or a network.

5. A hardware processor configured to perform operations of a first terminal in a wireless communication system, the operations comprising:
switching to a resource allocation mode 2 from a resource allocation mode 1 based on a detection of a beam failure or a declaration of a radio link failure for a base station,
wherein the resource allocation mode 1 is a mode that a transmission resource for a second terminal is determined by the base station, and the resource allocation mode 2 is a mode that the transmission resource for the second terminal is determined by the first terminal; and
transmitting data to the second terminal on a resource selected in a resource pool for the resource allocation mode 2,
wherein based on a first time period being equal to or larger than a second time period, the resource is selected by a sensing procedure for determining the resource is occupied by a second terminal,
wherein, based on the first time period being smaller than the second time period, the resource is randomly selected, and
wherein the first time period is a maximum limit period for transmitting the data and the second time period is an estimated period required for transmitting the data after the sensing procedure.

6. A non-transitory computer-readable recording medium having recorded thereon at least one program including a command for performing operations for a first terminal by at least one processor when being executed by the at least one processor, the operations comprising:
switching to a resource allocation mode 2 from a resource allocation mode 1 based on a detection of a beam failure or a declaration of a radio link failure for a base station,
wherein the resource allocation mode 1 is a mode that a transmission resource for a second terminal is determined by the base station, and the resource allocation mode 2 is a mode that the transmission resource for the second terminal is determined by the first terminal; and
transmitting data to the second terminal on a resource selected in a resource pool for the resource allocation mode 2,
wherein based on a first time period being equal to or larger than a second time period, the resource is selected by a sensing procedure for determining the resource is occupied by a second terminal,
wherein, based on the first time period being smaller than the second time period, the resource is randomly selected, and
wherein the first time period is a maximum limit period for transmitting the data and the second time period is an estimated period required for transmitting the data after the sensing procedure.

* * * * *